(12) United States Patent
Kim et al.

(10) Patent No.: US 11,677,690 B2
(45) Date of Patent: Jun. 13, 2023

(54) METHOD FOR PROVIDING SERVICE BY USING CHATBOT AND DEVICE THEREFOR

(71) Applicant: Samsung Electronics Co., Ltd., Suwon-si (KR)

(72) Inventors: Kyungtae Kim, Suwon-si (KR); Jaeyung Yeo, Suwon-si (KR); Dasom Lee, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 17/041,131

(22) PCT Filed: Mar. 18, 2019

(86) PCT No.: PCT/KR2019/003099
§ 371 (c)(1),
(2) Date: Sep. 24, 2020

(87) PCT Pub. No.: WO2019/190097
PCT Pub. Date: Oct. 3, 2019

(65) Prior Publication Data
US 2021/0119944 A1 Apr. 22, 2021

(30) Foreign Application Priority Data
Mar. 29, 2018 (KR) .................. 10-2018-0036856

(51) Int. Cl.
*H04L 51/02* (2022.01)
*G06F 16/332* (2019.01)
(Continued)

(52) U.S. Cl.
CPC .......... *H04L 51/02* (2013.01); *G06F 16/3329* (2019.01); *G06F 40/35* (2020.01); *G10L 15/22* (2013.01); *G10L 2015/223* (2013.01)

(58) Field of Classification Search
CPC ..... H04L 51/02; G06F 16/3329; G06F 40/35; G10L 15/22; G10L 2015/223; G06Q 50/30
See application file for complete search history.

(56) References Cited

U.S. PATENT DOCUMENTS 9,171,066 B2  10/2015  Hebert et al.
9,456,254 B2   9/2016  Sung et al.
(Continued)

FOREIGN PATENT DOCUMENTS

JP     2004-288018 A    10/2004
KR     10-1309042 B1     9/2013
(Continued)

OTHER PUBLICATIONS

International Search Report and Written Opinion of the International Searching Authority in connection with International Application No. PCT/KR2019/003099 dated Jul. 8, 2019, 10 pages.
(Continued)

*Primary Examiner* — Robert J Hance

(57) ABSTRACT

A system is disclosed. A system according to an embodiment may comprise a network interface, at least one processor, and at least one memory. The at least one memory may store instructions that, when executed, cause the at least one processor to: receive a first request for calling a first chatbot in connection with chatting based on text and/or speech through the network interface; request the first chatbot to join the chatting; receive a second request for calling a second chatbot in connection with the chatting through the network interface; request the second chatbot to join the chatting; receive a third request comprising a task related to the first chatbot and unrelated to the second chatbot; provide the third request to the first chatbot and the second chatbot after the first chatbot and the second chatbot join the chatting; receive a first response related to the task from the
(Continued)

first chatbot; receive a second response indicating failure of the task or inability regarding the task from the second chatbot; and provide only the first response through the network interface. Additional various embodiments identified through the specification are possible.

15 Claims, 17 Drawing Sheets

(51) Int. Cl.
  *G06F 40/35* (2020.01)
  *G10L 15/22* (2006.01)

(56) References Cited

U.S. PATENT DOCUMENTS

| | | | |
|---|---|---|---|
| 10,992,604 B1* | 4/2021 | Knas | H04L 51/04 |
| 11,012,386 B2 | 5/2021 | Lee | |
| 11,336,612 B2 | 5/2022 | Park et al. | |
| 2004/0107196 A1* | 6/2004 | Chen | G06F 16/958 |
| 2004/0189697 A1 | 9/2004 | Fukuoka et al. | |
| 2014/0136183 A1 | 5/2014 | Hebert et al. | |
| 2014/0143809 A1 | 5/2014 | Sung et al. | |
| 2017/0279906 A1* | 9/2017 | Laird-Mcconnell | H04L 51/02 |
| 2017/0310613 A1* | 10/2017 | Lalji | H04L 51/02 |
| 2018/0025085 A1 | 1/2018 | Sarangi et al. | |
| 2022/0263787 A1 | 8/2022 | Park et al. | |

FOREIGN PATENT DOCUMENTS

| | | |
|---|---|---|
| KR | 10-2014-0047491 A | 4/2014 |
| KR | 10-2014-0066025 A | 5/2014 |
| KR | 10-2015-0089723 A | 8/2015 |
| KR | 10-2017-0018577 A | 2/2017 |
| KR | 10-1712180 B1 | 3/2017 |
| KR | 10-1731867 B1 | 5/2017 |
| KR | 10-2018-0003417 A | 1/2018 |

OTHER PUBLICATIONS

Supplementary European Search Report dated Jan. 13, 2021 in connection with European Patent Application No. 19 77 5351, 7 pages.
Communication pursuant to Article 94(3) EPC dated Oct. 17, 2022, in connection with European Application No. 19775351.0, 7 pages.
Request for the Submission of an Opinion dated Dec. 8, 2022, in connection with Korean Application No. 10-2018-0036856, 23 pages.

* cited by examiner

METHOD FOR PROVIDING SERVICE BY USING CHATBOT AND DEVICE THEREFOR

CROSS-REFERENCE TO RELATED APPLICATIONS

This application is a 371 National Stage of International Application No. PCT/KR2019/003099, filed Mar. 18, 2019, which claims priority to Korean Patent Application No. 10-2018-0036856, filed Mar. 29, 2018, the disclosures of which are herein incorporated by reference in their entirety.

BACKGROUND

1. Field

Embodiments disclosed in the disclosure are related to a method for providing a service using a chatbot, and a device thereof.

2. Description of Related Art

An intelligence service may grasp a user's intent from a user input and may provide the result matched with the grasped intent. For example, the intelligence service may receive a text input or utterance input from the user. The text input or utterance input may be referred to as the user's command to perform a specific function. When the intelligence service receives the user's input, the intelligence service may grasp the user's intent based on a natural language processing technology.

SUMMARY

An intelligence service may provide 3rd party service in various fields. As the provided services are diversified, an artificial intelligence (AI) system for grasping a user's intent may be operated by an independent server for each service.

An electronic device may provide intelligence services in various fields through utterance-based or text-based chat services. An external server may provide a chatbot to the chat services and may chat with users through the chatbot. A user may enter a chat message for requesting a specific task of the external server through the chat services. When receiving the chat message, the external server may grasp the user's intent corresponding to the chat message. An external device may provide a specific service to a user by performing a task corresponding to the user's intent.

The electronic device may simultaneously provide a plurality of services by providing chat services with a plurality of chatbots. However, in the case of simply merging a plurality of different chatbots provided by different operators, a part of the chatbots may fail to respond to a user's message or may perform another function not matched with the user's intent.

Various embodiments of the disclosure provide a device for supporting a chat service capable of simultaneously providing various services through a plurality of chatbots, and a method thereof.

According to an embodiment disclosed in this specification, a system may include a network interface, at least one processor operatively connected to the network interface, and at least one memory operatively connected to the at least one processor. The at least one memory may store instructions that, when executed, cause the at least one processor to receive a first request for calling a first chatbot to a chat based on at least one of a text or voice through the network interface, to cause the first chatbot to join the chat, to receive a second request for calling a second chatbot to the chat through the network interface, to cause the second chatbot to join the chat, to receive a third request including a task that is associated with the first chatbot and is not associated with the second chatbot, to provide the third request to the first chatbot and the second chatbot after the first chatbot and the second chatbot join the chat, to receive a first response associated with the task from the first chatbot, to receive a second response indicating failure of the task or inability to the task from the second chatbot, and to provide only the first response through the network interface.

Furthermore, according to an embodiment disclosed in this specification, a method for providing a chat service may include starting a chat service in which a first chatbot providing a first service and a second chatbot providing a second service join, receiving a first chat message, which is directed to the first chatbot and is not directed to the second chatbot, through the chat service, providing the first chat message to the first chatbot and the second chatbot, receiving a first response generated depending on performing the first task from the first chatbot and receiving a second response including a failure message for the first task from the second chatbot, and providing the first response through the chat service and not providing the second response through the chat service. The first chat message may include a first task associated with the first chatbot.

Moreover, according to an embodiment disclosed in this specification, an electronic device may include a touch screen display, a microphone, a wireless communication circuit for communicating with a plurality of external servers, at least one processor electrically connected to the wireless communication circuit, and at least one memory connected to the at least one processor and storing instructions. When executed, the instructions may cause the at least one processor to execute an application for the chat service, to display a chat interface provided by the application on the touch screen display, to receive a chat message for requesting a task of the first chatbot provided by the first server among the plurality of external servers, through a touch input by the touch screen display or a voice input by the microphone, to provide the chat message to the first server and the second server through the chat service, to display a first response generated depending on performing the task from the first server, on the display through the chat interface, and not to display a second response generated depending on failure of the task from the second server on the display. The plurality of external servers may include a first server and a second server. The first server may provide a first chatbot. The second server may provide a second chatbot.

According to embodiments disclosed in this specification, it is possible to reduce the number of conversations (e.g., chat messages) for performing a task matched with a user's intent on a chat service using a plurality of chatbots.

Besides, a variety of effects directly or indirectly understood through the disclosure may be provided.

With regard to description of drawings, the same or similar denotations may be used for the same or similar components.

DETAILED DESCRIPTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
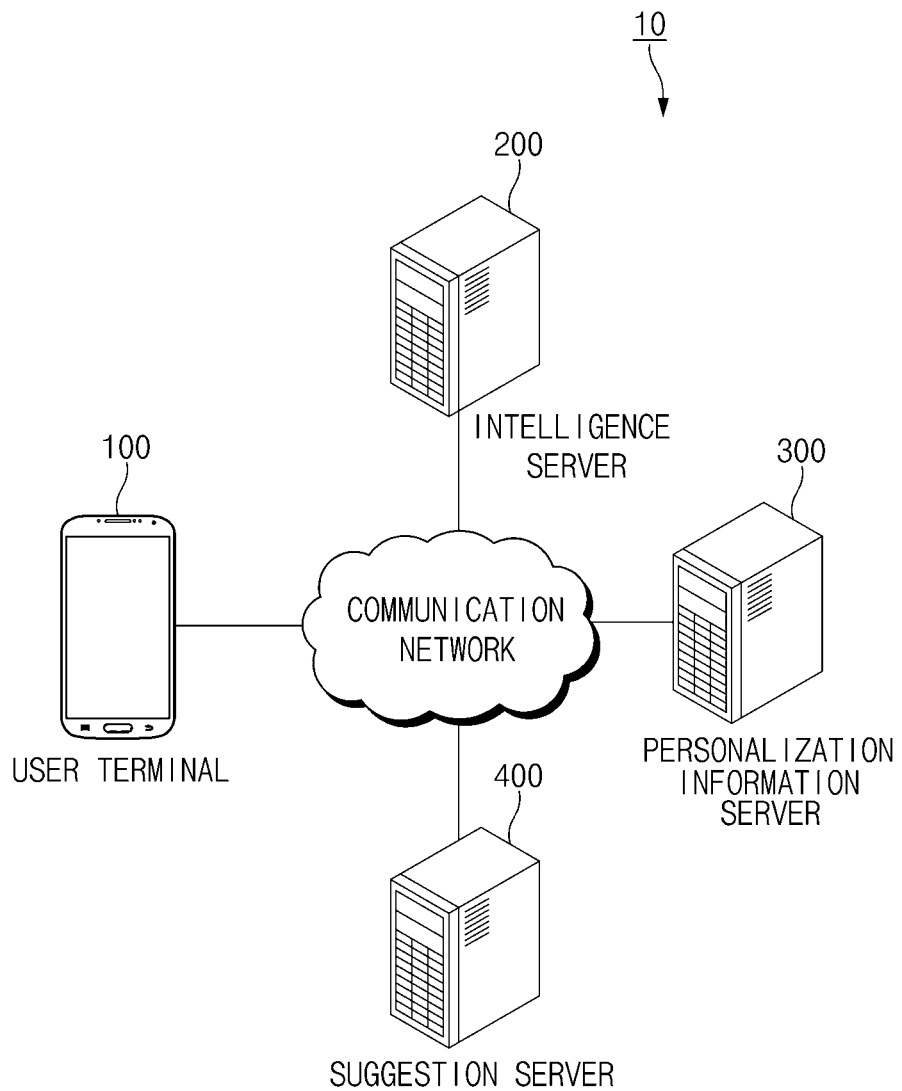
FIG. 1 is a view illustrating an integrated intelligence system, according to various embodiments of the disclosure.

FIG. 1 is a view illustrating an integrated intelligence system, according to various embodiments of the disclosure.

Referring to FIG. 1, an integrated intelligence system 10 may include a user terminal 100, an intelligence server 200, a personalization information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate another app through an intelligence app (or a speech recognition app) stored in the user terminal 100. The user terminal 100 may receive a user input for executing the other app and executing an operation (or action) through the intelligence app of the user terminal 100. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive a user utterance as a user input. The user terminal 100 may receive the user utterance and may generate a command for operating an app based on the user utterance. Accordingly, the user terminal 100 may operate the app, using the command.

The intelligence server 200 may receive a user voice input from the user terminal 100 over a communication network and may change the user voice input to text data. In another embodiment, the intelligence server 200 may generate (or select) a path rule based on the text data. The path rule may include information about an operation (or an operation) for performing the function of an app or information about a parameter necessary to perform the operation. In addition, the path rule may include the order of the operation of the app. The user terminal 100 may receive the path rule, may select an app depending on the path rule, and may execute the operation included in the path rule in the selected app.

Generally, the term "path rule" of the disclosure may mean, but not limited to, the sequence of states, which allows the electronic device to perform the task requested by the user. In other words, the path rule may include information about the sequence of the states. For example, the task may be a certain operation that the intelligence app is capable of providing. The task may include the generation of a schedule, the transmission of a picture to the desired counterpart, or the provision of weather information. The user terminal 100 may perform the task by sequentially having at least one or more states (e.g., the operating state of the user terminal 100).

According to an embodiment, the path rule may be provided or generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the path rule may be selected from a set of predefined path rules or may be generated in real time in response to a user request. For example, the AI system may select at least a path rule among the predefined plurality of path rules or may generate a path rule dynamically (or in real time). Furthermore, the user terminal 100 may use a hybrid system to provide the path rule.

According to an embodiment, the user terminal 100 may execute the operation and may display a screen corresponding to a state of the user terminal 100, which executes the operation, on a display. For another example, the user terminal 100 may execute the operation and may not display the result obtained by executing the operation in the display. For example, the user terminal 100 may execute a plurality of operations and may display only the result of a part of the plurality of operations on the display. For example, the user terminal 100 may display only the result, which is obtained by executing the last operation, on the display. For another example, the user terminal 100 may receive the user input to display the result obtained by executing the operation in the display.

The personalization information server 300 may include a database in which user information is stored. For example, the personalization information server 300 may receive the user information (e.g., context information, execution of an app, or the like) from the user terminal 100 and may store the user information in the database. The intelligence server 200 may be used to receive the user information from the personalization information server 300 over the communication network and to generate a path rule associated with the user input. According to an embodiment, the user terminal 100 may receive the user information from the personalization information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personalization information server 300. The user terminal 100 may receive information about the function to be provided from the suggestion server 400 over the communication network and may provide the information to the user.

Figure 2:
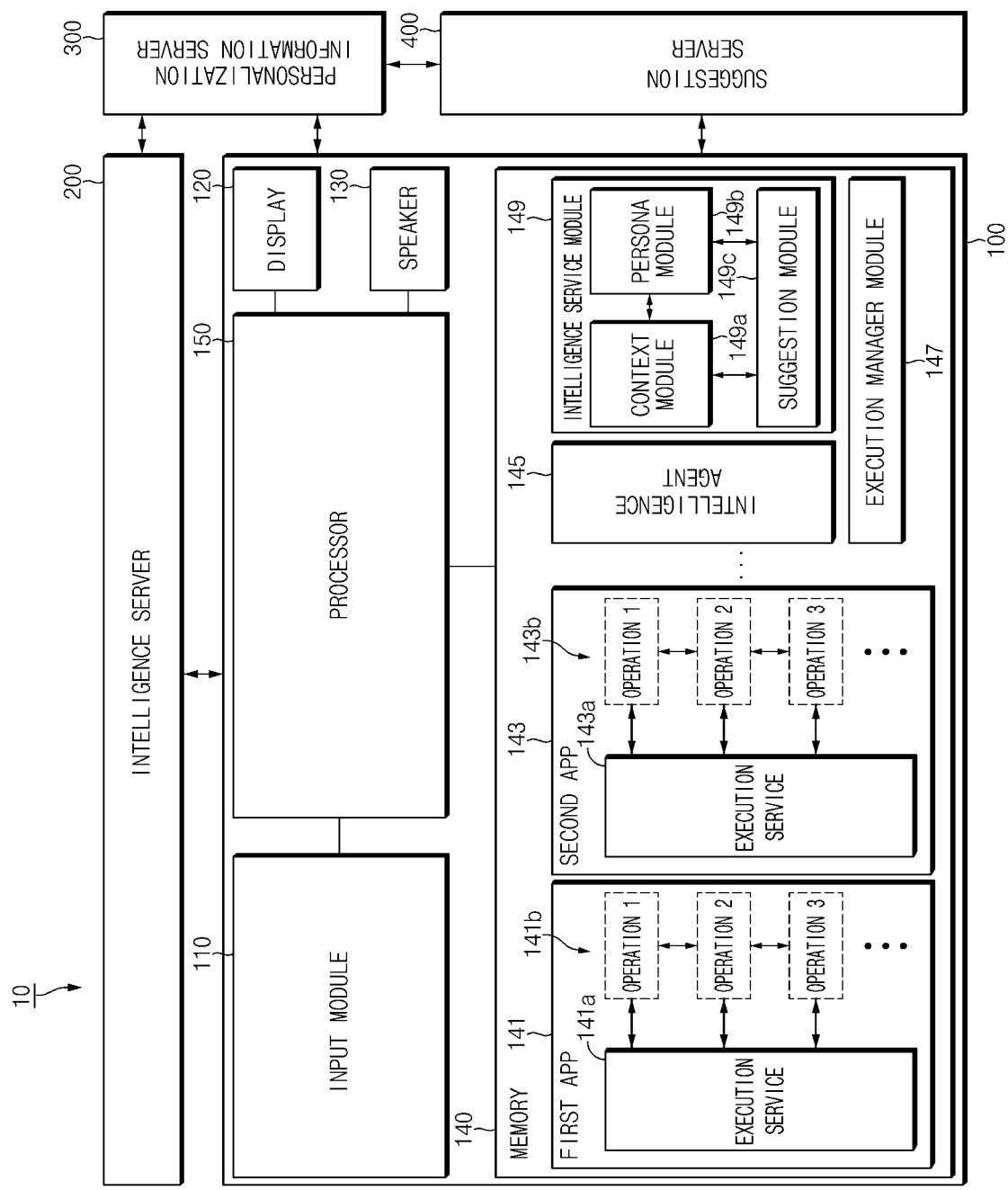
FIG. 2 is a block diagram illustrating a user terminal of an integrated intelligence system, according to an embodiment of the disclosure.

FIG. 2 is a block diagram illustrating a user terminal of an integrated intelligence system, according to an embodiment of the disclosure.

Referring to FIG. 2, the user terminal 100 may include an input module 110, a display 120, a speaker 130, a memory 140, or a processor 150. The user terminal 100 may further include housing, and elements of the user terminal 100 may be seated in the housing or may be positioned on the housing. The user terminal 100 may further include a communication circuit positioned in the housing. The user terminal 100 may transmit or receive data (or information) to or from an external server (e.g., the intelligence server 200) through the communication circuit.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone capable of receiving the utterance of the user as a voice signal. For example, the input module 110 may include a speech input system and may receive the utterance of the user as a voice signal through the speech input system. For example, the microphone may be exposed through a part (e.g., a first portion) of the housing.

According to an embodiment, the display 120 may display an image, a video, and/or an execution screen of an application. For example, the display 120 may display a graphic user interface (GUI) of an app. According to an embodiment, the display 120 may be exposed to a part (e.g., a second part) of the housing.

According to an embodiment, the speaker 130 may output a voice signal. For example, the speaker 130 may output the voice signal generated in the user terminal 100 to the outside. According to an embodiment, the speaker 130 may be exposed to a part (e.g., a third portion) of the housing.

According to an embodiment, the memory 140 may store a plurality of apps (or application programs) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, the intelligence agent 145, the execution manager module 147, and the intelligence service module 149 may be a framework (or application framework) for processing the received user input (e.g., user utterance).

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141*a* and 143*a* performing a function. In an embodiment, the plurality of apps 141 and 143 may perform a plurality of operations (e.g., a sequence of states) 141*b* and 143*b* through execution service modules 141*a* and 143*a* to perform a function. In other words, the execution service modules 141*a* and 143*a* may be activated by the execution manager module 147, and then may execute the plurality of operations 141*b* and 143*b*.

According to an embodiment, when the operations 141*b* and 143*b* of the apps 141 and 143 are executed, an execution state screen according to the execution of the operations 141*b* and 143*b* may be displayed in the display 120. For example, the execution state screen may be a screen in a state where the operations 141*b* and 143*b* are completed. For another example, the execution state screen may be a screen in a state where the execution of the operations 141*b* and 143*b* is in partial landing (e.g., when a parameter necessary for the operations 141*b* and 143*b* are not entered).

According to an embodiment, the execution service modules 141*a* and 143*a* may execute the operation 141*b* and 143*b* depending on a path rule. For example, the execution service modules 141*a* and 143*a* may be activated by the execution manager module 147, may receive an execution request from the execution manager module 147 depending on the path rule, and may execute functions of the apps 141 and 143 by performing the operations 141*b* and 143*b* depending on the execution request. When the execution of the operations 141*b* and 143*b* is completed, the execution service modules 141*a* and 143*a* may transmit completion information to the execution manager module 147.

According to an embodiment, when the plurality of operations 141*b* and 143*b* are respectively executed in the apps 141 and 143, the plurality of operations 141*b* and 143*b* may be executed sequentially. When the execution of one operation (e.g., operation 1 of the first app 141 or operation 1 of the second app 143) is completed, the execution service modules 141*a* and 143*a* may open the next action (e.g., operation 2 of the first app 141 or operation 2 of the second app 143) and may transmit the completion information to the execution manager module 147. Here, it is understood that opening an arbitrary operation is to transition a state of the arbitrary operation to an executable state or to prepare the execution of an arbitrary operation. In other words, when an arbitrary operation is not opened, the corresponding operation may not be executed. When the completion information is received, the execution manager module 147 may transmit the execution request for the next operation (e.g., operation 2 of the first app 141 or operation 2 of the second app 143) to the execution service module. According to an embodiment, when the plurality of apps 141 and 143 are executed, the plurality of apps 141 and 143 may be sequentially executed. For example, when receiving the completion information after the execution of the last operation (e.g., operation 3 of the first app 141) of the first app 141 is completed, the execution manager module 147 may transmit the execution request of the first operation (e.g., operation 1 of the second app 143) of the second app 143 to the execution service module 143*a*.

According to an embodiment, when the plurality of operations 141*b* and 143*b* are executed in the apps 141 and 143, the result screen according to the execution of each of the executed plurality of operations 141*b* and 143*b* may be displayed on the display 120. According to an embodiment, only the part of a plurality of result screens according to the execution of the executed plurality of operations 141*b* and 143*b* may be displayed on the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touchscreen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall operations of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and may read or store necessary information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate an instruction for launching an app based on the voice signal received as the user input. According to an embodiment, the processor 150 may execute the execution manager module 147 to launch the apps 141 and 143 stored in the memory 140 depending on the generated instruction. According to an embodiment, the processor 150 may execute the intelligence service module 149 to manage information of a user and may process a user input, using the information of the user.

The processor 150 may execute the intelligence agent 145 to transmit a user input received through the input module 110 to the intelligence server 200 and may process the user input through the intelligence server 200.

According to an embodiment, before transmitting the user input to the intelligence server 200, the processor 150 may execute the intelligence agent 145 to pre-process the user input. According to an embodiment, to pre-process the user input, the intelligence agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, using the detected end-point. The AGC module may recognize the user input and may adjust the volume of the user input so as to be suitable to process the recognized user input. According to an embodiment, the processor 150 may execute all the pre-processing configurations for performance. However, in another embodiment, the processor 150 may execute a part of the pre-processing configurations to operate at low power.

According to an embodiment, the intelligence agent 145 may execute a wakeup recognition module stored in the memory 140 to recognize the call of a user. As such, the processor 150 may recognize the wakeup command of a user through the wakeup recognition module and may execute the intelligence agent 145 for receiving a user input when receiving the wakeup command. The wakeup recognition module may be implemented with a low-power processor (e.g., a processor included in an audio codec). According to an embodiment, when receiving a user input through a hardware key, the processor 150 may execute the intelligence agent 145. When the intelligence agent 145 is executed, an intelligence app (e.g., a speech recognition app) operating in conjunction with the intelligence agent 145 may be executed.

According to an embodiment, the intelligence agent 145 may include a speech recognition module for executing the user input. The processor 150 may recognize the user input for executing an operation in an app through the speech recognition module. For example, the processor 150 may recognize a limited user (voice) input (e.g., an utterance such as "click" for performing a capture operation when a camera app is being executed) for performing an operation such as the wakeup command in the apps 141 and 143 through the speech recognition module. The processor 150 may recognize and rapidly process a user command capable of being processed in the user terminal 100 through the speech recognition module by assisting the intelligence server 200. According to an embodiment, the speech recognition module of the intelligence agent 145 for executing a user input may be implemented in an app processor.

According to an embodiment, the speech recognition module (including the speech recognition module of a wake up module) of the intelligence agent 145 may recognize the user input, using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may deliver the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149b.

According to an embodiment, the processor 150 may execute the execution manager module 147, may receive the path rule from the intelligence agent 145, and may execute the apps 141 and 143; and the processor 150 may allow the apps 141 and 143 to execute the operations 141b and 143b included in the path rule. For example, the processor 150 may transmit command information (e.g., path rule information) for executing the operations 141b and 143b to the apps 141 and 143, through the execution manager module 147; and the processor 150 may receive completion information of the operations 141b and 143b from the apps 141 and 143.

According to an embodiment, the processor 150 may execute the execution manager module 147 to transmit the command information (e.g., path rule information) for executing the operations 141b and 143b of the apps 141 and 143 between the intelligence agent 145 and the apps 141 and 143. The processor 150 may bind the apps 141 and 143 to be executed depending on the path rule through the execution manager module 147 and may deliver the command information (e.g., path rule information) of the operations 141b and 143b included in the path rule to the apps 141 and 143. For example, the processor 150 may sequentially transmit the operations 141b and 143b included in the path rule to the apps 141 and 143, through the execution manager module 147 and may sequentially execute the operations 141b and 143b of the apps 141 and 143 depending on the path rule.

According to an embodiment, the processor 150 may execute the execution manager module 147 to manage execution states of the operations 141b and 143b of the apps 141 and 143. For example, the processor 150 may receive information about the execution states of the operations 141b and 143b from the apps 141 and 143, through the execution manager module 147. For example, when the execution states of the operations 141b and 143b are in partial landing (e.g., when a parameter necessary for the operations 141b and 143b are not input), the processor 150 may deliver information about the partial landing to the intelligence agent 145, through the execution manager module 147. The processor 150 may make a request for an input of necessary information (e.g., parameter information) to the user, using the received information through the intelligence agent 145. For another example, when the execution state of each of the operations 141b and 143b is an operating state, the processor 150 may receive an utterance from the user through the intelligence agent 145. The processor 150 may transmit information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may deliver the received parameter information to the execution manager module 147 through the intelligence agent 145. The execution manager module 147 may change a parameter of each of the operations 141b and 143b to a new parameter, using the received parameter information.

According to an embodiment, the processor 150 may execute the execution manager module 147 to transmit parameter information included in the path rule to the apps 141 and 143. When the plurality of apps 141 and 143 are sequentially executed depending on the path rule, the execution manager module 147 may deliver the parameter information included in the path rule from one app to another app.

According to an embodiment, the processor may execute the execution manager module 147 to receive a plurality of path rules. The processor 150 may select a plurality of path rules based on the utterance of the user, through the execution manager module 147. For example, when the user utterance specifies a partial app 141 executing a partial operation 141a but does not specify the other app 143 executing the remaining operation 143b, the processor 150 may receive a plurality of different path rules, in which the same app 141 (e.g., a gallery app) executing the partial operation 141a is executed and the different app 143 (e.g., a message app or Telegram app) executing the remaining operation 143b is executed, through the execution manager module 147. For example, the processor 150 may execute the same operations 141b and 143b (e.g., the same successive operations 141b and 143b) of the plurality of path rules, through the execution manager module 150. When the processor 150 executes the same operation, the processor 150 may display a state screen for selecting the different apps 141 and 143 respectively included in the plurality of path rules in the display 120, through the execution manager module 147.

According to an embodiment, the intelligence service module 149 may include a context module 149a, a persona module 149b, or a suggestion module 149c.

The processor 150 may execute the context module 149a to collect current states of the apps 141 and 143 from the apps 141 and 143. For example, the processor 150 may execute the context module 149a to receive context information indicating the current states of the apps 141 and 143 and may collect the current states of the apps 141 and 143 through the received context information.

The processor 150 may execute the persona module 149b to manage personal information of the user utilizing the user terminal 100. For example, the processor 150 may execute the persona module 149b to collect usage information and the execution result of the user terminal 100 and may manage the personal information of the user by using the collected usage information and the collected execution result of the user terminal 100.

The processor 150 may execute the suggestion module 149c to predict the intent of the user and may recommend an instruction to the user based on the intent of the user. For example, the processor 150 may execute the suggestion module 149c to recommend an instruction to the user depending on the current state (e.g., a time, a place, a situation, or an app) of the user.

Figure 3:
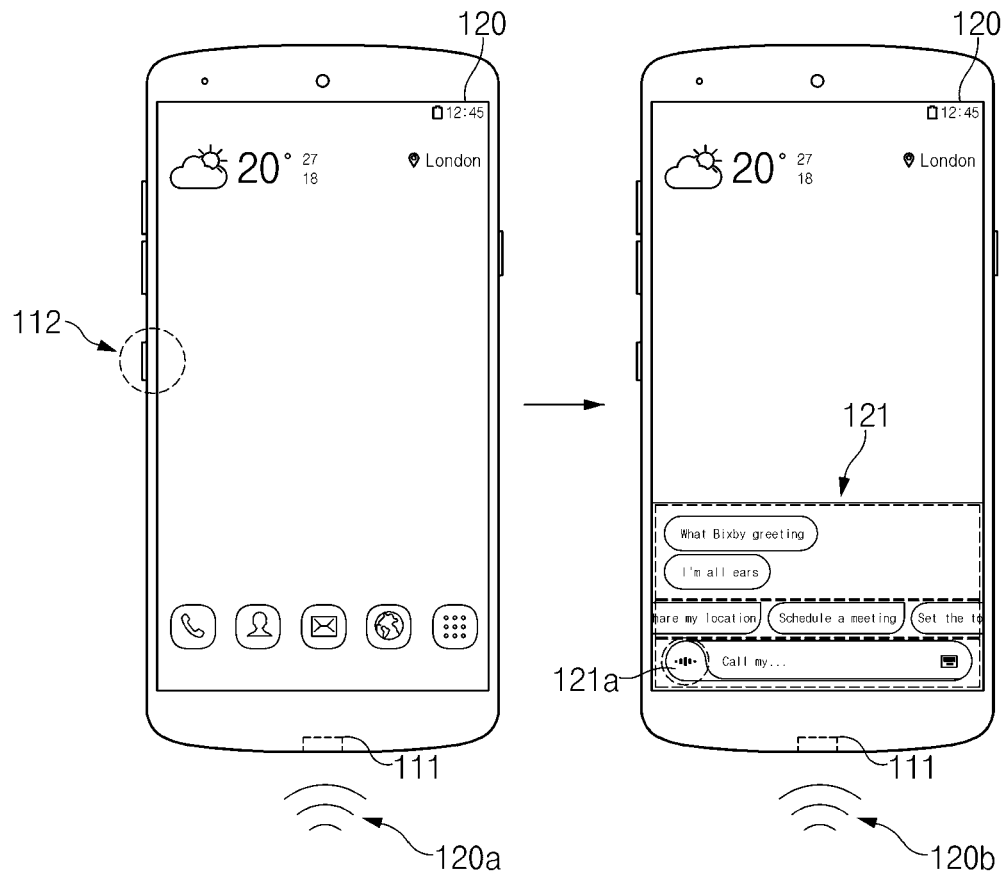
FIG. 3 is a view illustrating that an intelligence app of a user terminal is executed, according to an embodiment of the disclosure.

FIG. 3 is a view illustrating that an intelligence app of a user terminal is executed, according to an embodiment of the disclosure.

FIG. 3 illustrates that the user terminal 100 receives a user input to execute an intelligence app (e.g., a speech recognition app) operating in conjunction with the intelligence agent 145.

According to an embodiment, the user terminal 100 may execute the intelligence app for recognizing a voice through a hardware key 112. For example, when the user terminal 100 receives the user input through the hardware key 112, the user terminal 100 may display a UI 121 of the intelligence app on the display 120. For example, a user may touch a speech recognition button 121*a* on the UI 121 of the intelligence app for the purpose of entering (111*b*) a voice in a state where the UI 121 of the intelligence app is displayed on the display 120. For another example, while continuously pressing the hardware key 112 to enter (120*b*) the voice, the user may enter (120*b*) the voice.

According to an embodiment, the user terminal 100 may execute the intelligence app for recognizing a voice through the microphone 111. For example, when a specified voice (e.g., wake up!) is entered (111*a*) through the microphone 111, the user terminal 100 may display the UI 121 of the intelligence app on the display 120.

Figure 4:
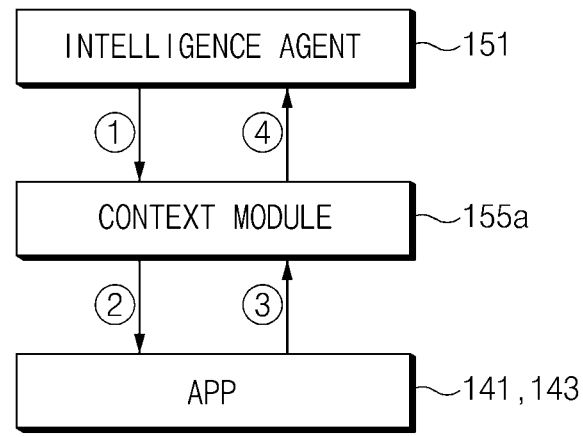
FIG. 4 is a block diagram illustrating that a context module of an intelligence service module collects a current state, according to an embodiment of the disclosure.

FIG. 4 is a block diagram illustrating that a context module of an intelligence service module collects a current state, according to an embodiment of the disclosure.

Referring to FIG. 4, when receiving a context request from the intelligence agent 145 (①), the processor 150 may request context information indicating the current states of apps 141 and 143 through the context module 149*a* (②). According to an embodiment, the processor 150 may receive the context information from the apps 141 and 143 through the context module 149*a* (③) and may transmit the context information to the intelligence agent 145 (④).

According to an embodiment, the processor 150 may receive pieces of context information from apps 141 and 143 through the context module 149*a*. The context information may be information about the most recently executed apps 141 and 143. For another example, the context information may be information (e.g., when a user watches a photo through a gallery app, information about the corresponding photo) bout the current states in the apps 141 and 143.

According to an embodiment, the processor 150 may receive context information indicating a current state of the user terminal 100 from a device platform as well as the apps 141 and 143, through the context module 149*a*. The context information may include general context information, user context information, or device context information.

The general context information may include general information of the user terminal 100. The general context information may be verified by receiving data through a sensor hub or the like of the device platform such that the data is processed through an internal algorithm. For example, the general context information may include information about current time and space. For example, the information about the current time and space may include information about current time or a current location of the user terminal 100. The current time may be identified through the time on the user terminal 100, and the information about the current location may be identified through a global positioning system (GPS). For another example, the general context information may include information about physical motion. For example, the information about the physical motion may include information about walking, running, driving, or the like. The information about the physical motion may be identified through a motion sensor. The information about the driving may be identified by sensing Bluetooth connection in a vehicle such that boarding and parking is identified as well as identifying the driving through the motion sensor. For another example, the general context information may include user activity information. For example, the user activity information may include information about commuting, shopping, travel, or the like. The user activity information may be identified by using information about a place where a user or an app registers in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule performed by the execution manager module 147. For another example, the device information may include information about a battery. For example, the information about the battery may be identified through charging and discharging states of the battery. For another example, the device information may include information about a connected device and a network. For example, the information about the connected device may be identified through a communication interface connected with the device.

Figure 5:
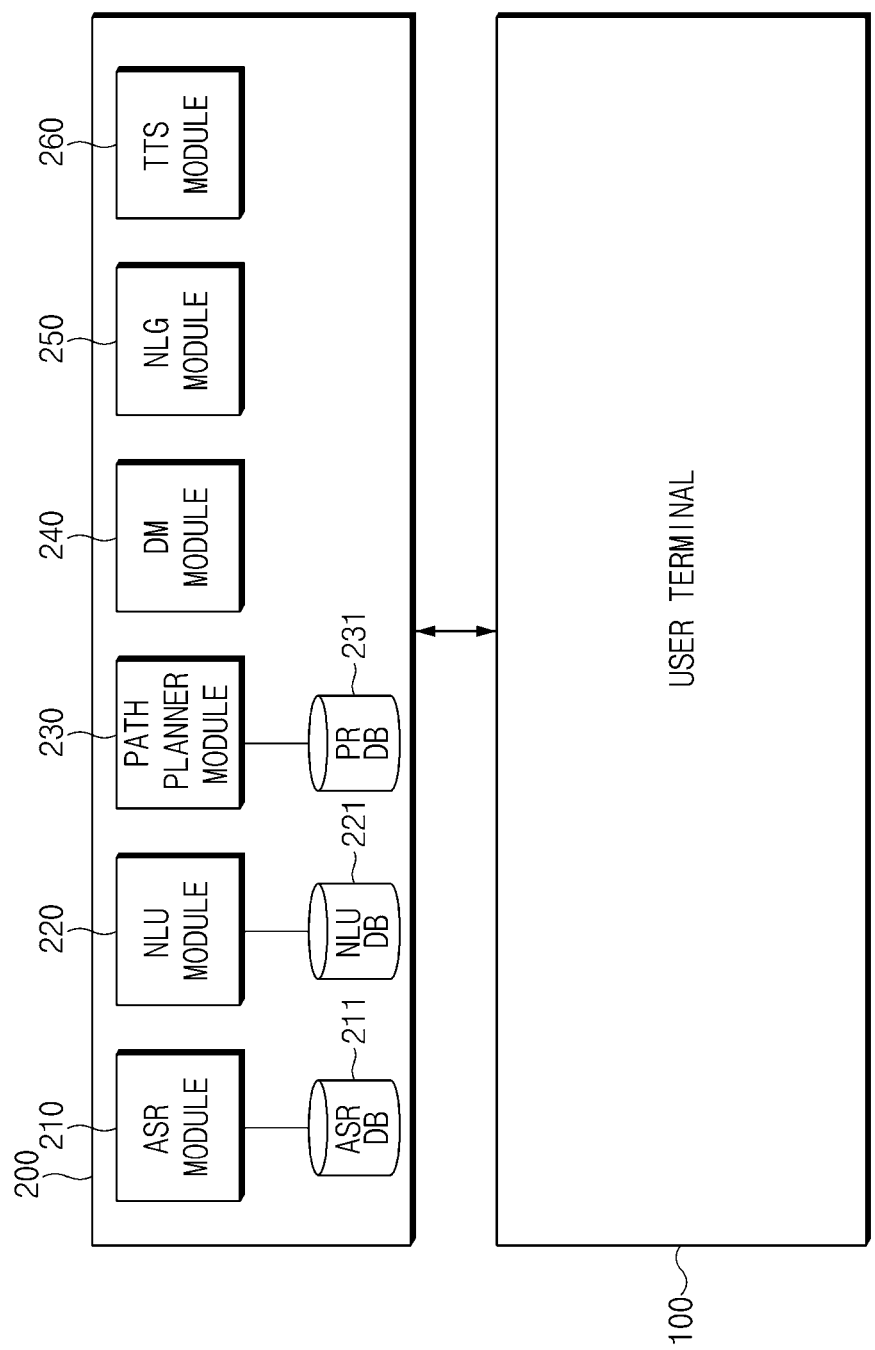
FIG. 5 is a block diagram illustrating an intelligence server of an integrated intelligence system, according to an embodiment of the disclosure.

FIG. 5 is a block diagram illustrating an intelligence server of an integrated intelligence system, according to an embodiment of the disclosure.

Referring to FIG. 5, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligence server 200 may include a communication circuit, a memory, and a processor. The processor may execute an instruction stored in the memory to operate the ASR module 210, the NLU module 220, the path planner module 230, the DM module 240, the NLG module 250, or the TTS module 260. The intelligence server 200 may transmit or receive data (or information) to or from an external electronic device (e.g., the user terminal 100) through the communication circuit.

The NLU module 220 or the path planner module 230 of the intelligence server 200 may generate a path rule.

According to an embodiment, the ASR module 210 may change the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert a user utterance into text data, using information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and may determine which syntactic elements the divided units have. The semantic analysis may be performed by using semantic matching, rule matching, formula matching, or the like. As such, the NLU module 220 may obtain a domain, intent, or a parameter (or a slot) necessary to express the intent, from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., syntactic elements) such as morphemes, phrases, and the like and may match the grasped meaning of the words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an operation to be executed, in the selected app. The NLU module 220 may determine the parameter corresponding to the determined operation to generate the path rule. According to an embodiment, the path rule generated by the NLU module 220 may include information about the app to be executed, the operation (e.g., at least one or more states) to be executed in the app, and a parameter necessary to execute the operation.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the operation to be executed in the app, and a parameter necessary to execute the operation based on the intent of the user input and the parameter to generate one path rule or a plurality of path rules. For example, the NLU module 220 may arrange the app to be executed and the operation to be executed in the app by using information of the user terminal 100 depending on the intent of the user input in the form of ontology or a graph model to generate the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, when only a part of operation is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 at a request for the user input. For example, the NLU module 220 may transmit one path rule corresponding to the user input to the user terminal 100. For another example, the NLU module 220 may transmit the plurality of path rules corresponding to the user input to the user terminal 100. For example, when only a part of operation is specified based on the user utterance, the plurality of path rules may be generated by the NLU module 220.

According to an embodiment, the path planner module 230 may select at least one path rule of the plurality of path rules.

According to an embodiment, the path planner module 230 may deliver a path rule set including the plurality of path rules to the NLU module 220. The plurality of path rules of the path rule set may be stored in the PR DB 231 connected to the path planner module 230 in the table form. For example, the path planner module 230 may deliver a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to deliver the selected one path rule or the selected plurality of path rules to the NLU module 220. For example, the path planner module 230 may match the user intent and the parameter to the path rule set corresponding to the user terminal 100 to select one path rule or a plurality of path rules and may deliver the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the operation to be executed in the app based on the user intent and the parameter to generate the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user's intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, when the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. When the content provider module executes an operation based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. The information changed to the text form may be in the form of a natural language speech. For example, the specified information may be information about an additional input, information for guiding the completion of an operation corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information in the text form to information of a voice form. The TTS module 260 may receive the information of the text form from the NLG module 250, may change the information of the text form to the information of a voice form, and may transmit the information of the voice form to the user terminal 100. The user terminal 100 may output the information in the voice form to the speaker 130.

According to an embodiment, the NLU module 220, the path planner module 230, and the DM module 240 may be implemented with one module. For example, the NLU module 220, the path planner module 230, and the DM module 240 may be implemented with one module, may determine the user intent and the parameter, and may generate a response (e.g., a path rule) corresponding to the determined user intent and parameter. As such, the generated response may be transmitted to the user terminal 100.

Figure 6:
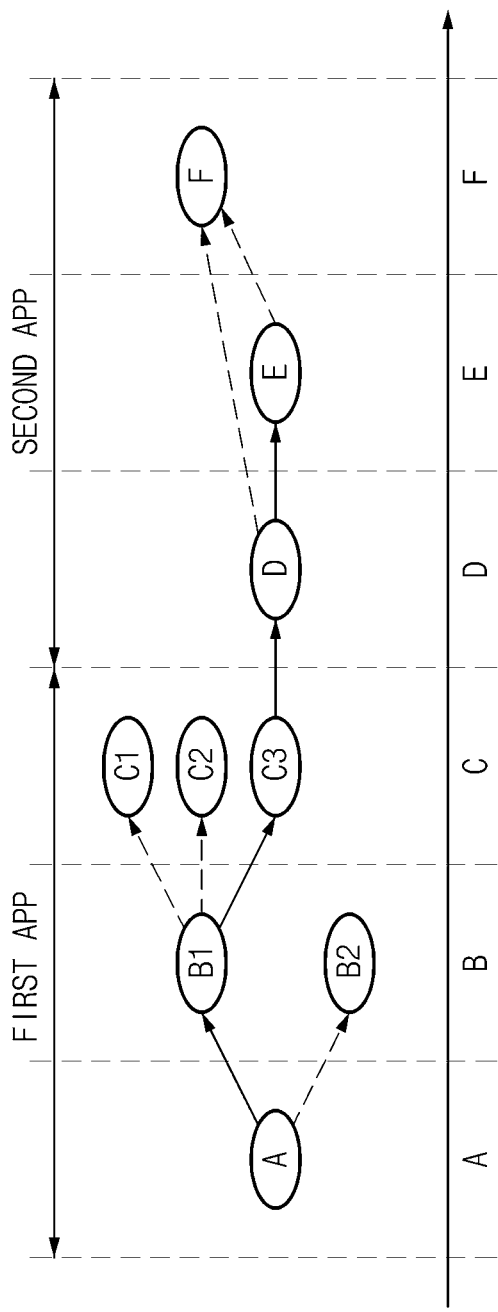
FIG. 6 is a view illustrating a path rule generating method of a natural language understanding (NLU) module, according to an embodiment of the disclosure.

FIG. 6 is a diagram illustrating a path rule generating method of a path planner module, according to an embodiment of the disclosure.

Referring to FIG. 6, according to an embodiment, the NLU module 220 may divide the function of an app into any one operation (e.g., state A to state F) and may store the divided unit operations in the PR DB 231. For example, the NLU module 220 may store a path rule set including a plurality of path rules A-B1-C1, A-B1-C2, A-B1-C3-D-F, and A-B1-C3-D-E-F, which are divided into operations (e.g., states), in the PR DB 231.

According to an embodiment, the PR DB 231 of the path planner module 230 may store the path rule set for performing the function of an app. The path rule set may include a plurality of path rules, each of which includes a plurality of operations (e.g., a sequence of states). The operation executed depending on a parameter input to each of the plurality of operations may be sequentially arranged in each of the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, when there is no path rule completely matched to the user input, the NLU module 220 may deliver a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may deliver the one or more path rules to the user terminal 100.

According to an embodiment, the NLU module 220 may select one of a plurality of path rules based on an input added by the user terminal 100 and may deliver the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 to transmit the selected one path rule to the user terminal 100.

According to another embodiment, the NLU module 220 may determine the intent of a user and the parameter corresponding to the user input (e.g., an input for selecting C3) additionally entered by the user terminal 100 to transmit the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the operations of the apps 141 and 143 based on the selected one path rule.

According to an embodiment, when a user input in which information is insufficient is received by the intelligence server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may deliver the partly corresponding path rule to the execution manager module 147. The processor 150 may execute the first app 141 depending on the path rule through the execution manager module 147. The processor 150 may transmit information about an insufficient parameter to the intelligence agent 145 through the execution manager module 147 while executing the first app 141. The processor 150 may make a request for an additional input to a user, using the information about the insufficient parameter, through the intelligence agent 145. When the additional input is received by the user through the intelligence agent 145, the processor 150 may transmit and process a user input to the intelligence server 200. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145 to execute the second app 143.

According to an embodiment, when a user input, in which a part of information is missing, is received by the intelligence server 200, the NLU module 220 may transmit a user information request to the personalization information server 300. The personalization information server 300 may transmit information of a user entering the user input stored in a persona database to the NLU module 220. The NLU module 220 may select a path rule corresponding to the user input in which a part of an operation is partly missing, by using the user information. As such, even though the user input in which a portion of information is missing is received by the intelligence server 200, the NLU module 220 may make a request for the missing information to receive an additional input or may determine a path rule corresponding to the user input by using user information.

According to an embodiment, Table 1 attached below may indicate an exemplary form of a path rule associated with a task that a user requests.

TABLE 1

| Path rule ID | State | Parameter |
|---|---|---|
| Gallery_101 | PictureView(25) | NULL |
| | SearchView(26) | NULL |
| | SearchViewResult(27) | Location, time |
| | SearchEmptySelectedView(28) | NULL |
| | SearchSelectedView(29) | ContentType, selectall |
| | CrossShare(30) | Anaphora |

Referring to Table 1, a path rule that is generated or selected by an intelligence server (the intelligence server 200 of FIG. 1) depending on a user utterance (e.g., "please share a photo") may include at least one state 25, 26, 27, 28, 29 or 30. For example, the at least one state (e.g., one operating state of a terminal) may correspond to at least one of picture application execution PicturesView 25, picture search function execution SearchView 26, search result display screen output SearchViewResult 27, search result display screen output, in which a picture is non-selected, SearchEmptySelectedView 28, search result display screen output, in which at least one picture is selected, SearchSelectedView 29, or share application selection screen output CrossShare 30.

In an embodiment, parameter information of the path rule may correspond to at least one state. For example, it is possible to be included in the state of SearchSelectedView 29, in which at least one picture is selected.

The task (e.g., "please share a picture!") that the user requests may be performed depending on the execution result of the path rule including the sequence of the states 25, 26, 27, 28, and 29.

Figure 7:
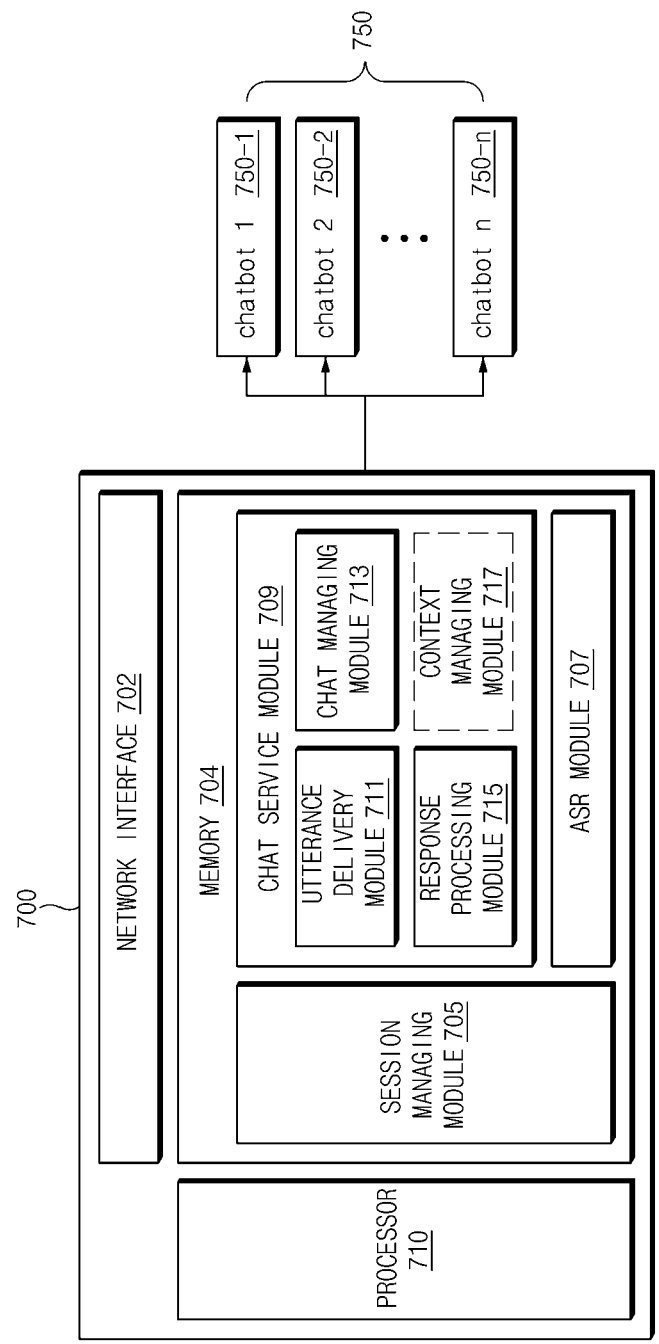
FIG. 7 is a diagram illustrating an intelligence system for providing a chat service according to various embodiments.

FIG. 7 is a diagram illustrating an intelligence system for providing a chat service according to various embodiments.

Referring to FIG. 7, an intelligence server (or an intelligence system) 700 may provide a chat service based on a text and/or voice. The chat service may provide various services provided by a plurality of external servers. For example, each of the external servers may provide a chatbot for providing each service by chatting with a user. The user and a plurality of chatbots 750 may chat with each other through the chat service. The chatbot 750 may provide an external server-based service through a chat interface of the chat service. The user and the plurality of chatbots 750 may simultaneously receive various services through a group chat.

The intelligence server 700 may receive a user's utterance or the user's text input, and may generate a chat message corresponding to the utterance or text input. The intelligence server 700 may transmit the generated chat message to the chatbots 750 and may receive a response to the chat message from the chatbots 750. In particular, the intelligence server 700 may transmit the generated chat message to the plurality of chatbots 750, in a group chat joined by the plurality of chatbots 750. The intelligence server 700 may determine which response the intelligence server 700 will provide through the chat service among a plurality of responses received from the plurality of chatbots 750.

In various embodiments, when the intelligence server 700 receives an utterance from a user, the intelligence server 700 may convert the utterance into a text through an ASR module 707. Similarly to the intelligence server 200 of FIG. 5, the intelligence server 700 may analyze the user utterance or the converted text and may generate a chat message corresponding to the utterance or the converted text.

In an embodiment, the chatbots 750 may provide a specific service based on an external server. The chatbots 750 may join a chat service by the intelligence server 500 and may provide a user joining the chat service with a service in a specific field. The chatbots 750 may include a NLU module (e.g., the NLU module 220 of FIG. 5). The chatbots 750 may grasp the user's intent from the received chat message, using the NLU model. The chatbots 750 may provide a specific service corresponding to the identified user intent. When the plurality of chatbots 750 join a chat, a plurality of services corresponding to the plurality of chatbots 750 may be provided to the user.

According to an embodiment, the intelligence server 700 may include a network interface 702, a memory 704, and a processor 710. The processor 710 may be operatively connected to the network interface 702. The memory 704 may be operatively connected to the processor 710 and may store instructions. For example, the intelligence server 700 including the single processor 710 and the single memory 704 is illustrated. The illustrated processor 710 may include a plurality of processors, and the memory 704 may include a plurality of memories.

In an embodiment, the intelligence server 700 may include a session managing module 705. The session managing module 705 may receive requests for various services provided by the intelligence server 700 including a chat service, and may deliver the requests to the corresponding service. An embodiment associated with the session managing module 705 will be described later with reference to FIGS. 13 and 14.

In an embodiment, the intelligence server 700 may include a chat service module 709. The chat service module 709 may include an utterance delivery module 711, a chat managing module 713, and a response processing module 715. The chat service module 709 may further include a context managing module 717. For example, the utterance delivery module 711, the chat managing module 713, the response processing module 715, and the context managing module 717 may be stored in the memory 704.

According to an embodiment, the configuration of the intelligence server 700 may be implemented as a hardware module for performing each function. According to another embodiment, the intelligence server 700 may include the network interface 702, the at least one memory 704, and the at least one processor 710 for implementing functions corresponding to the configuration. The network interface 702 and the memory 704 may be operatively connected to the processor 710. According to an embodiment, when being executed, the instructions stored in the memory 704 may cause the processor 710 to perform a function corresponding to the configuration by perform a specified operation. Hereinafter, it may be understood that the operation of the chat service module 709 is performed by the processor 710.

In an embodiment, the utterance delivery module 711 may determine which chatbot a user input (e.g., a chat message) is delivered to among a plurality of chatbots invited to a chat. For example, the utterance delivery module 711 may deliver a user input to all of the plurality of chatbots. When a chat between a user and a specific chatbot is in progress, the utterance delivery module 711 may deliver a user input to only the specific chatbot.

In an embodiment, the chat managing module 713 may determine whether the ongoing chat is a 1:1 chat or group chat. The chat managing module 713 may invite another chatbot during the 1:1 chat between a user and a specific chatbot, and then may start a group chat. Alternatively, the chat management module 713 may exit any one of the chatbots joining the group chat.

The chat managing module 713 may identify a chatbot that is chatting with a user. The chat management module 713 may determine which session the chatbot is in. For example, a chatbot belonging to the group chat may be determined to be included in a group session. When a specific chatbot belonging to the group chat is performing 1:1 chat with a user, the specific chatbot may be determined to be included in a sub-session. For example, in the group chat to which a first chatbot and a second chatbot belong, it may be determined that the first chatbot and the second chatbot are included in the group session. When the user performs the 1:1 chat with the first chatbot in the group chat, the first chatbot may be determined to belong to a sub-session. In various embodiments, a plurality of different sub-sessions may be formed in the single group chat.

In an embodiment, the response processing module 715 may pre-process the response received from the chatbot and may deliver the pre-processed result to the user through the chat service. The response processing module 715 may not provide some of the responses received from the plurality of chatbots in group chat. Alternatively, the response processing module 715 may generate a single response corresponding to responses received from the plurality of chatbots, and may provide the single response.

In an embodiment, the context managing module 717 may control the context information such that context information is shared among a plurality of chatbots. For example, when the second chatbot is invited in the 1:1 chat between the first chatbot and the user, the context information collected through the first chatbot may be delivered to the second chatbot. The context managing module 717 may be modified to be suitable for the chatbot that receives the context information.

Figure 8:
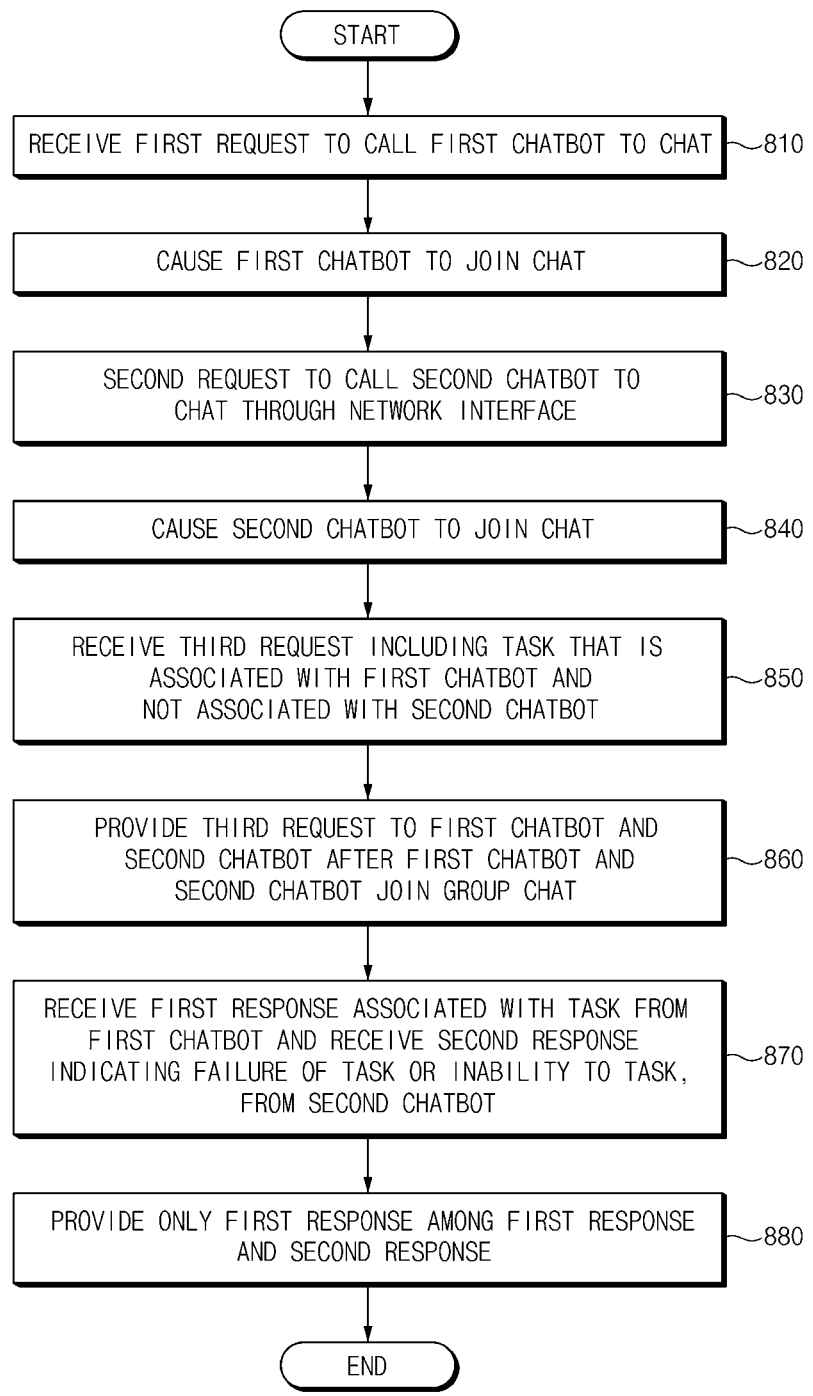
FIG. 8 is a flowchart of a method of providing a chat service joined by a plurality of chatbots according to an embodiment.
Figure 9A:
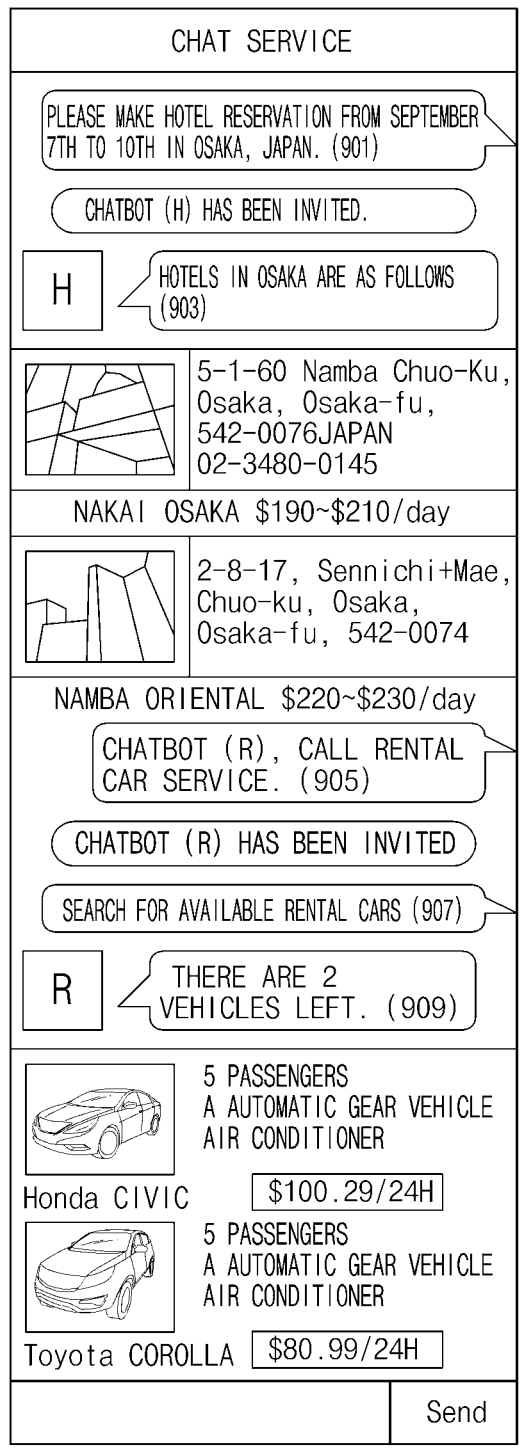
FIGS. 9A, 9B, and 9C are views illustrating examples of a chat interface of a chat service provided according to various embodiments.
Figure 9B:
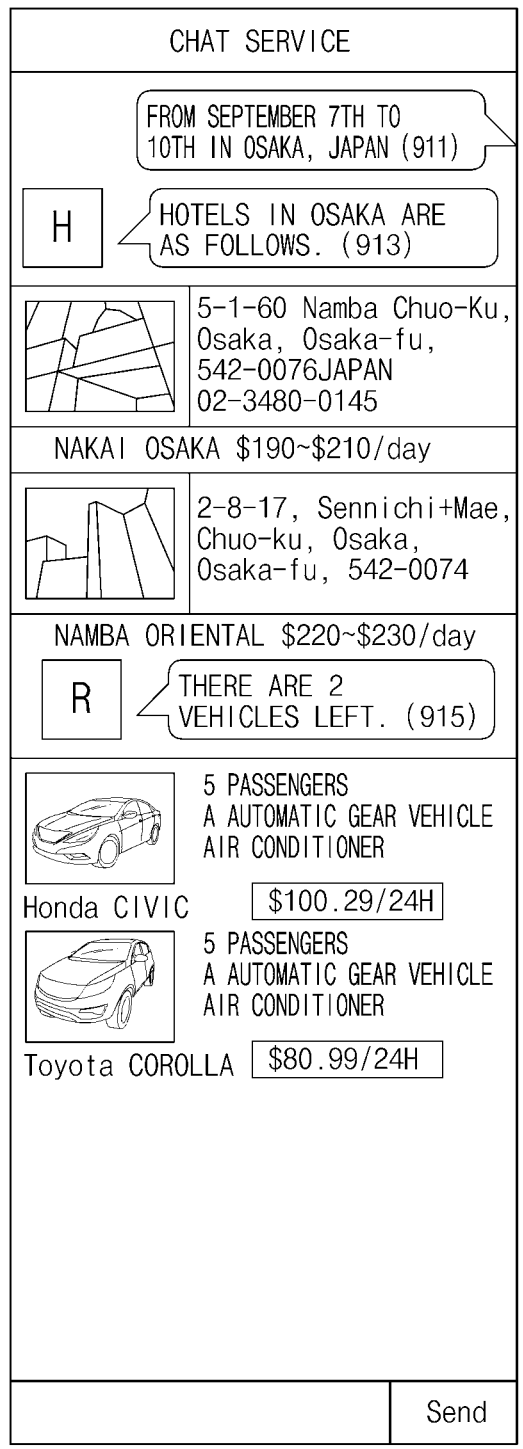
Figure 9C:
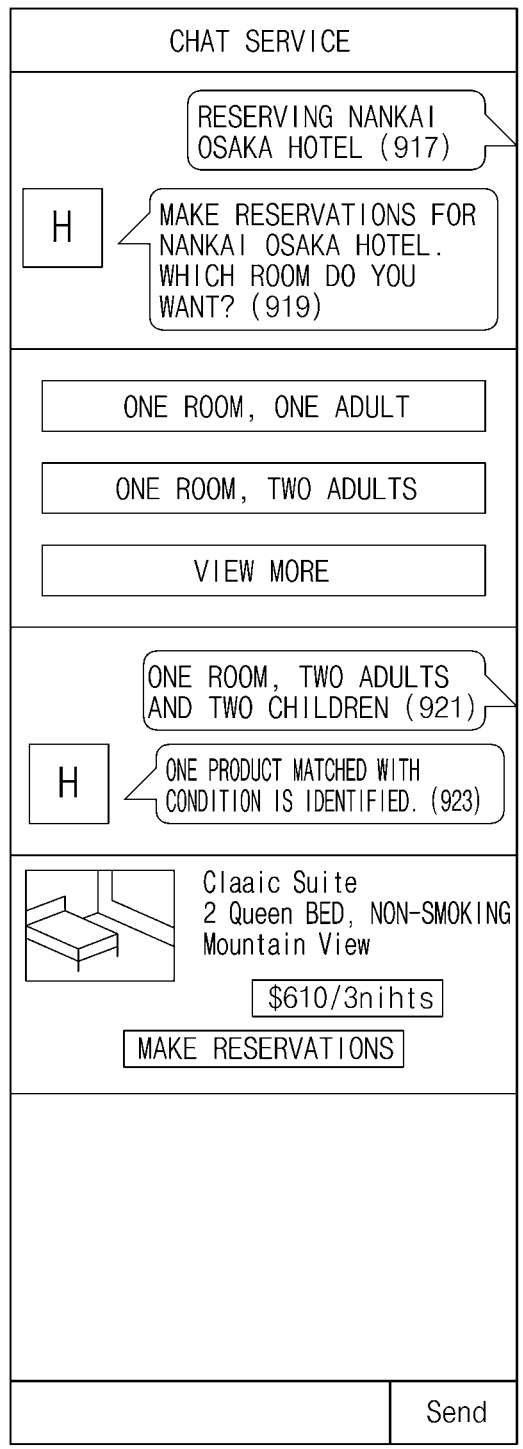

FIG. 8 is a flowchart of a method of providing a chat service joined by a plurality of chatbots according to an embodiment. FIGS. 9A, 9B, and 9C are views illustrating examples of a chat interface of a chat service provided according to various embodiments. Hereinafter, a method of providing a chat service according to an embodiment may be described with reference to FIGS. 8, 9A, 9B, and 9C.

Referring to FIG. 8, a method of providing a chat service according to an embodiment may include operation 810 to operation 880. For example, operation 810 to operation 880 may be executed by the intelligence server 700 in FIG. 7. For example, each operation in operation 810 to operation 880 may be implemented by the processor 710 of the intelligence server 700 or instructions capable of being performed (or executed) by at least one module included in the processor 710. For example, the instructions may be stored in a computer-readable recording medium or the memory 704 of the intelligence server 700. Hereinafter, reference numerals in FIG. 7 may be referenced in the descriptions about operation 810 to operation 880, and a description the same as the description given with reference to FIG. 7 may not be repeated here.

Referring to FIGS. 9A, 9B, and 9C, a plurality of chat interfaces (1) to (3) are illustrated. A chat (e.g., a group chat) joined by a chatbot H providing a hotel reservation service and a chatbot R providing a rental car reservation service is illustrated as an example.

In an embodiment, the intelligence server 700 may provide a chat service to a user of a user terminal (e.g., the user terminal 100 in FIG. 2) through the network interface 702. The plurality of chatbots 750 and the user may chat with each other based on a text and/or voice on the chat service.

In operation 810, the intelligence server 700 may receive a first request (e.g., a chat message) to call the first chatbot to a chat through the network interface 702. In operation 820, the intelligence server 700 may cause the first chatbot to join the chat.

For example, the first request may be received from the user terminal. The user may enter a chat message for calling the first chatbot to use the first service provided by the first chatbot. When the first chatbot joins the chat, the 1:1 chat between the user and the first chatbot may be started.

Referring to FIGS. 9A, 9B and 9C, the chatbot H may provide the user with a service for hotel reservation. The intelligence server 700 may obtain a user input of "please make a hotel reservation from September 7th to 10th in Osaka, Japan". The user input may be obtained by a text input or utterance input. The user input may be displayed in the chat interface (1) as illustrated in a chat message 901. The chat message 901 may include a request to call the chatbot H. The intelligence server 700 may cause the chatbot H to join the chat.

In various embodiments, the chat interface may be provided through an application installed in a user terminal (e.g., the user terminal 100 of FIG. 2). The chat interface may be displayed through the display of the user terminal. The user may chat with a plurality of chatbots through a chat interface and may use the service provided by the plurality of chatbots.

In operation 830, the intelligence server 700 may receive a second request (e.g., a chat message) to call the second chatbot to the chat through the network interface 702. In operation 840, the intelligence server 700 may cause the second chatbot to join the chat.

For example, the user may enter a chat message for calling the second chatbot to use the second service provided by the second chatbot. The second chatbot may join the 1:1 chat between the first chatbot and the user. For example, a group chat among a user, the first chatbot, and the second chatbot may be started. The intelligence server 700 may merge chatbots independently operated by different servers and may provide the user with a plurality of services through a single chat service. For example, until the intelligence server 700 receives a request to end the chat (e.g., a command of 'end a conversation'), the intelligence server 700 may deliver a request received from a user terminal to the first chatbot and/or the second chatbot.

Referring to FIGS. 9A, 9B and 9C, the chatbot H may provide the user with a service for booking a rental car. The intelligence server 700 may obtain a user input of 'call a rental car service'. The user input may be displayed in the chat interface (1) as illustrated in a chat message 905. The chat message 905 may include a request to call the chatbot R. The intelligence server 700 may cause the chatbot R to join the chat.

In operation 850, the intelligence server 700 may receive a third request including a task that is associated with the first chatbot and not associated with the second chatbot. In operation 860, after the first chatbot and the second chatbot join the chat, the intelligence server 700 may provide the third request to the first chatbot and the second chatbot.

For example, a task included in the third request may be performed by the first chatbot, but may be referred to as a task incapable of being performed by the second chatbot. The task may be associated with the first service provided by the first chatbot. The third request may be referred to as a request directed to the first chatbot. Because the intelligence server 700 does not pre-store requests capable of being processed by the first chatbot and the second chatbot operated by the external server, the intelligence server 700 may provide the third request to all of the plurality of chatbots joining the chat without determining which chatbot the third request may be processed by. The intelligence server 700 may provide the third request to both the first chatbot and the second chatbot joining the chat.

Referring to FIGS. 9A, 9B, and 9C, the intelligence server 700 may obtain a user input of 'search for available rental cars'. The user input may be displayed in the chat interface (1) as illustrated in a chat message 907. The chat message 907 may include a request including a task of 'rental car search', or may be referred to as the request. The task of 'rental car search' is associated with the rental car reservation service and the chatbot R. However, the intelligence server 700 may provide the chat message 907 to the chatbot H and the chatbot R joining the chat without determining which chatbot the chat message 907 may be processed by.

In operation 870, the intelligence server 700 may receive a first response associated with the task from the first chatbot and may receive the second response indicating the failure of the task or the inability to the task, from the second chatbot. For example, the second response may be referred to as a null value.

For example, the first chatbot and the second chatbot may store a command for providing each service and a response to each command in advance. The user's request may be delivered to the chatbot as a command. When the user's request is received, the chatbot may determine whether the request corresponds to a pre-stored command. When the received request corresponds to the pre-stored command, the chatbot may provide a response corresponding to the stored command to the intelligence server 700.

Referring to FIGS. 9A, 9B, and 9C, a request corresponding to the chat message 907 may not be performed by the chatbot H, but may be performed by the chatbot R. The intelligence server 700 may receive a rental car search result from the chatbot R as a response, and may receive a response indicating the failure of the task or the inability to the task, such as 'this is an incomprehensible command', from the chatbot H.

For example, when the received chat message 907 does not include a pre-stored command or is not mapped onto a predetermined rule, the chatbot may determine the failure of the task or the inability of the task. For another example, a case of not being mapped onto the predetermined rule may be defined as a specific rule. In the case of corresponding to the specific rule, the chatbot may determine the failure of the task or the inability of the task.

In operation 880, the intelligence server 700 may provide only the first response among the first response and the second response through the network interface 702. The intelligence server 700 may not provide a second response. For example, the first response may be provided to the user through the chat interface. The user's intent corresponding to the third request has been to receive the first response from the first chatbot, and thus the second response not matched with the user's intent may not be provided to the user.

Referring to FIGS. 9A, 9B, and 9C, the response of the chatbot R to the chat message 907 is displayed as a chat message 909 in the chat interface (1). The intelligence server 700 may receive a response to the chat message 907 from the chatbot H and the chatbot R. The chatbot R may provide the rental car search result for the 'rental car search task' included in the chat message 907, and the chatbot H may provide a failure message. The intelligence server 700 may provide a rental car search result received from the chatbot R as a chat message 909 and may not provide a failure message received from the chatbot H.

In various embodiments, when a chat message incapable of being performed by both the chatbot R and the chatbot H is entered, the intelligence server 700 may display a response indicating the failure of a task or the inability to the task, such as 'this is an incomprehensible command' of the chatbot R and the chatbot H, to the chat interface. Alternatively, when the response of all chatbots joining the conversation is the failure of the task or inability to the task, the intelligence server 700 may display a single representative response in the chat interface. For example, the intelligence server 700 may display a response such as 'this is a command that cannot be understood by all chatbots' as the representative response.

In various embodiments, the chatbot R may use context information collected by the chatbot H. The chatbot R may provide rental car search results, using location information (Osaka in Japan) and date information (from September 7 to September 10) included in the chat message 901 of the chat interface (1). When a specific chatbot newly is joined in a group chat situation, the intelligence server 700 may provide the newly joined chatbot with context information obtained through chatbots previously joining a group chat.

Figure 10:
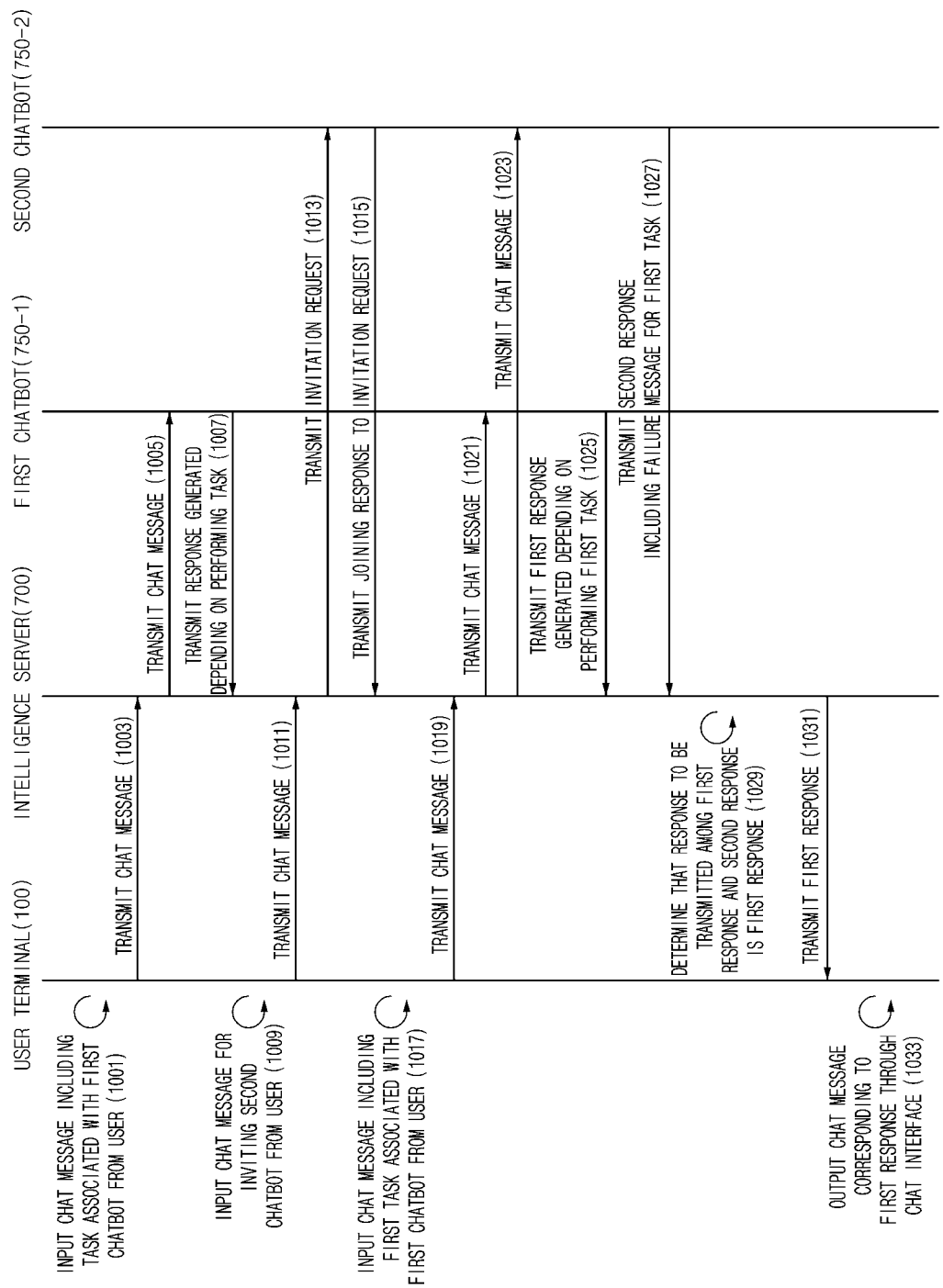
FIG. 10 is a sequence diagram of a method for providing a chat service according to an embodiment.

FIG. 10 is a sequence diagram of a method for providing a chat service according to an embodiment.

Referring to FIG. 10, a chat service may be provided by the intelligence server 700. A user may utilize the chat service through the user terminal 100. The user terminal 100 may be referred to as the user terminal 100 of FIG. 2. Hereinafter, reference numerals of FIG. 2 may be cited.

In an embodiment, the user terminal 100 may include the processor 150, the touch screen display 120, and the microphone 111. The user terminal 100 may include a wireless communication circuit for communicating with an external server. The processor 150 may provide a chat service provided by the intelligence server 700.

In an embodiment, the user terminal 100 may execute an application for a chat service, and may display a chat interface (e.g., the chat interface of FIGS. 9A, 9B, and 9C) provided by the application on the touch screen display 120. For example, a chat (e.g., 1:1 chat) joined by the first chatbot 750-1 may be performed by a chat service.

In an embodiment, the user terminal 100 may receive a chat message including a task associated with a first chatbot 750-1 through a touch input by the touch screen display 120 or a voice input by the microphone 111 (1001). The user terminal 100 may transmit the received chat message to the intelligence server 700 (1003). The intelligence server 700 may transmit a request included in the received chat message to the first chatbot 750-1 (1005). The first chatbot 750-1 may transmit a first response generated depending on performing the first task, to the intelligence server 700 (1007).

In an embodiment, the user terminal 100 may receive a chat message for inviting a second chatbot 750-2 (1009). The user terminal 100 may transmit the received chat message to the intelligence server 700 (1011). The intelligence server 700 may transmit an invitation request included in the received chat message to the second chatbot 750-2 (1013). The second chatbot 750-2 may transmit a joining response to the invitation request (1015). For example, a chat (e.g., group chat) joined by the first chatbot 750-1 and the second chatbot 750-2 may be started by a chat service.

In an embodiment, the user terminal 100 may receive a chat message including a first task associated with a first chatbot 750-1 through a touch input by the touch screen display 120 or a voice input by the microphone 111 (1017). The chat message may be directed to the first chatbot 750-1 and may not be directed to the second chatbot 750-2. The user terminal 100 may transmit the received chat message to the intelligence server 700 (1019).

In an embodiment, the intelligence server 700 may transmit a request included in the received chat message to both the first chatbot 750-1 and the second chatbot 750-1 (1021 and 1023). The first chatbot 750-1 may transmit a first response generated depending on performing the first task, to the intelligence server 700 (1025). The second chatbot 750-2 may transmit a second response including a failure message for the first task to the intelligence server 700 (1027).

In an embodiment, the intelligence server 700 may determine that a response to be transmitted to the user terminal 100 among the received first response and second response is the first response (1029). The intelligence server 700 may transmit only the first response among the first response and the second response to the user terminal 100 (1031). The second response may not be transmitted to the user terminal 100. The user terminal 100 may output a chat message corresponding to the first response through a chat interface (1033).

In various embodiments, the intelligence server 700 may transmit a response including a failure message to the user terminal 100. For example, when the user terminal 100 receives a response including a failure message, the user terminal 100 may output a chat message such as "this is an incomprehensible command. Please tell me again.". For example, when the intelligence server 700 receives a failure message from a plurality of chatbots included in the group chat, the intelligence server 700 may provide a plurality of failure messages as a single chat message (e.g., this is a command that cannot be understood by all chatbots).

Figure 11:
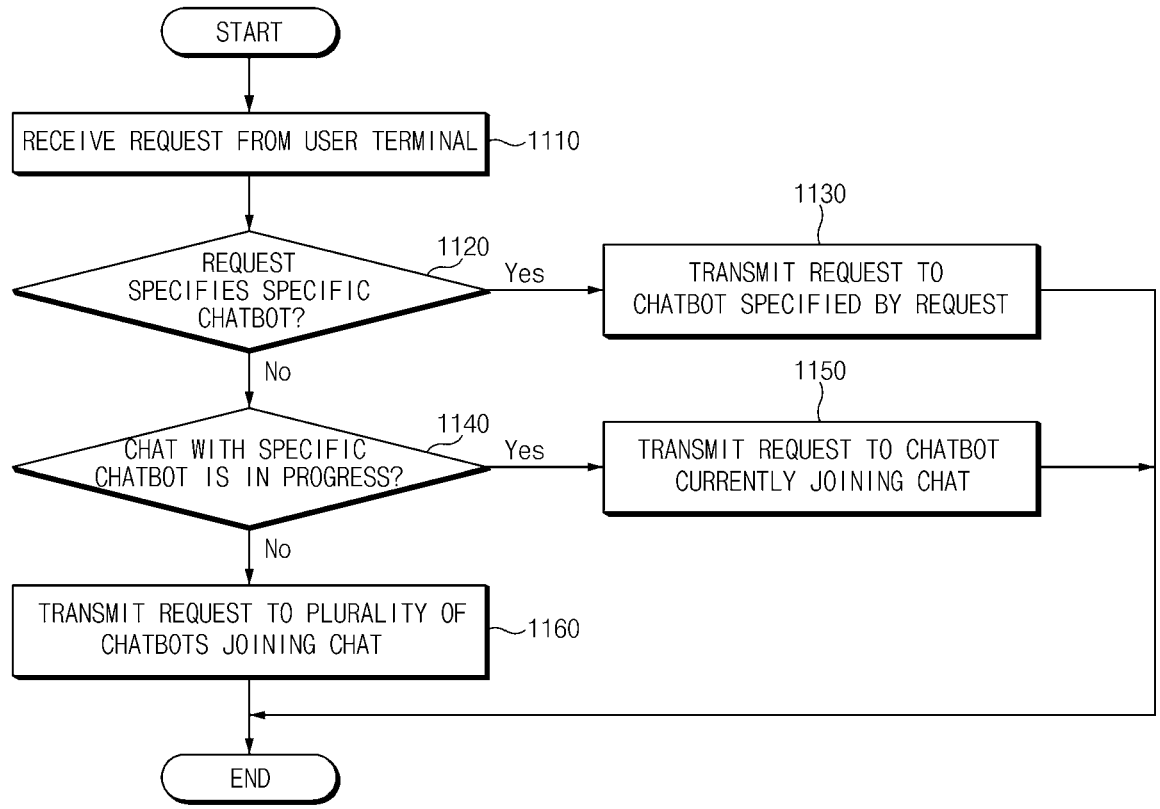
FIG. 11 is a flowchart of a method for providing a chat service according to various embodiments.

FIG. 11 is a flowchart of a method for providing a chat service according to various embodiments.

Referring to FIG. 11, a method of providing a chat service according to various embodiments may include operation 1110 to operation 1160. For example, operation 1110 to operation 1160 may be executed by the intelligence server 700 in FIG. 7. For example, each operation in operation 1110 to operation 1160 may be implemented by the processor 710 of the intelligence server 700 or instructions capable of being performed (or executed) by at least one module included in the processor 710. For example, the instructions may be stored in a computer-readable recording medium or the memory 704 of the intelligence server 700. Hereinafter, reference numerals in FIG. 7 may be referenced in the descriptions about operation 1110 to operation 1160, and a description the same as the description given with reference to FIG. 7 may not be repeated here. Hereinafter, FIGS. 9A, 9B and 9C may be referenced for a description of a method for providing a chat service according to various embodiments.

In operation 1110, the intelligence server 700 may receive a request (e.g., a chat message) through the network interface 702. For example, the intelligence server 700 may receive a chat message associated with at least one chatbot from the user terminal 100 through a chat service.

In operation 1120, the intelligence server 700 may determine whether the received request specifies a specific chatbot. For example, when the name of the specific service, the parameter of the task provided by the specific service, and the like are included in the text input or utterance input of the user corresponding to the request, it may be determined that the request specifies the chatbot of the specific service.

In FIGS. 9A, 9B, and 9C, for example, when the chat message of 'search for hotels from H service' is entered into the chat service, the chat message includes the H service name provided by the chatbot H. The intelligence server 700 may determine that the chat message specifies the chatbot H. For example, when the chat message of 'please reserve a hotel' is entered into the chat service, the chat message includes 'hotel' that is a parameter of the hotel reservation task performed by the chatbot H. The intelligence server 700 may determine that the chat message specifies the chatbot H.

When the received request specifies a specific chatbot, in operation 1130, the intelligence server 700 may transmit the request to a specific chatbot specified by the request among a plurality of chatbots joining a chat.

When the received request does not specify a specific chatbot, in operation 1140, the intelligence server 700 may determine whether the 1:1 chat between a user and a specific chatbot among a plurality of chatbots joining the chat is in progress. For example, when the specific chatbot is in a sub-session state, the intelligence server 700 may determine that the 1:1 chat between the specific chatbot and the user is in progress. For example, the chat managing module 713 of FIG. 7 may determine the session states of a plurality of chatbots. The intelligence server 700 may transmit a request to a chatbot belonging to a sub-session.

When the 1:1 chat between the user and the specific chatbot is in progress, in operation 1150, the intelligence server 700 may transmit the request to the specific chatbot currently joining the 1:1 chat.

When the 1:1 chat between the user and the specific chatbot is not in progress, in operation 1160, the intelligence server 700 may transmit the request to a plurality of chatbots joining the chat. For example, the intelligence server 700 may transmit the request to a plurality of chatbots belonging to a group session.

Figure 12:
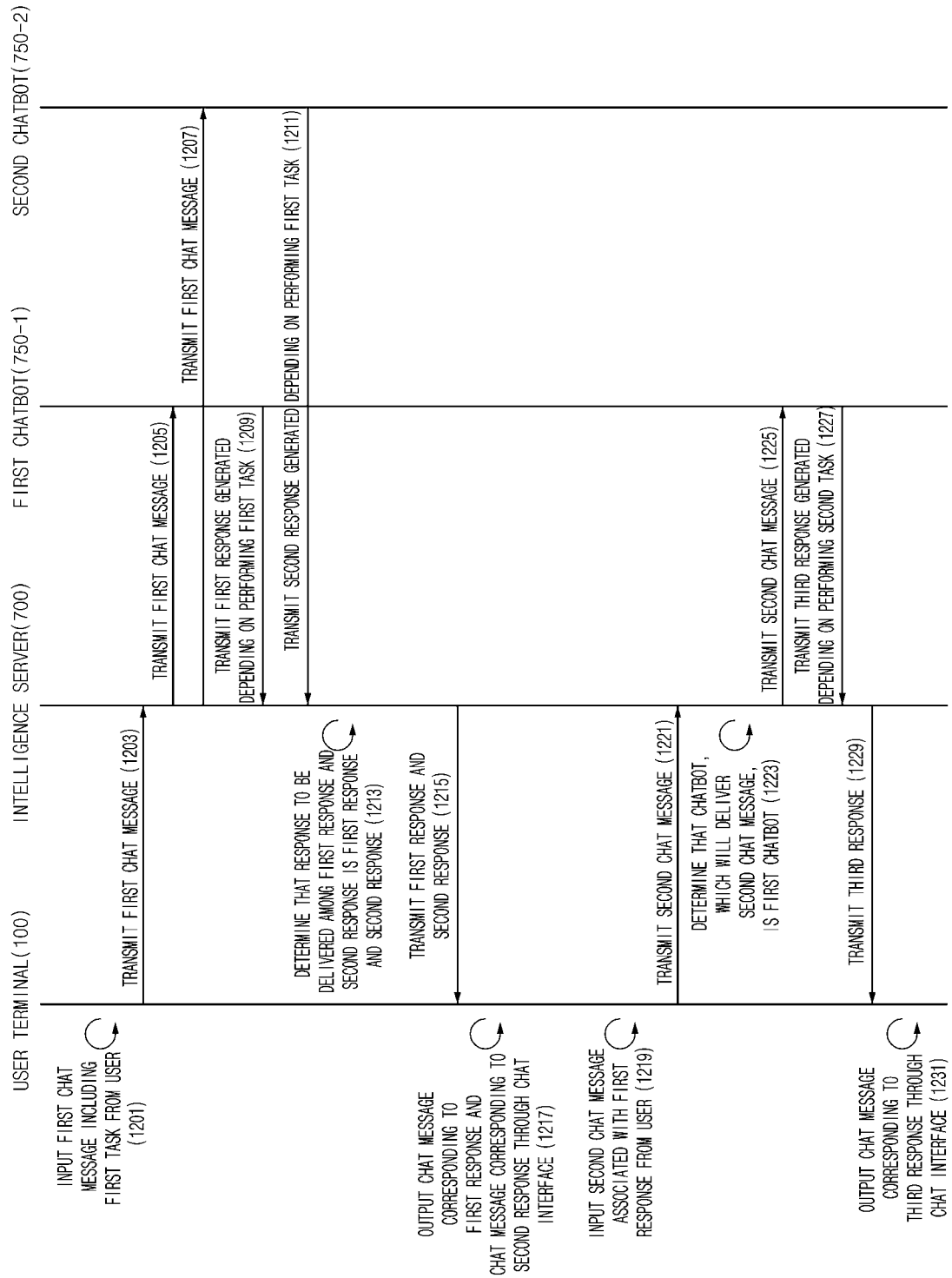
FIG. 12 is a sequence diagram of a method for providing a chat service according to various embodiments.

FIG. 12 is a sequence diagram of a method for providing a chat service according to various embodiments. Hereinafter, FIGS. 9A, 9B and 9C may be referenced for a description of a method for providing a chat service according to various embodiments.

Referring to FIG. 12, the user terminal 100 (e.g., the user terminal 100 of FIG. 2) according to an embodiment may receive a first chat message including a first task from a user (1201). The first task may be associated with the first chatbot 750-1 and the second chatbot 750-2. The user terminal 100 may transmit a first chat message to the intelligence server 700 (1203).

In an embodiment, the intelligence server 700 may transmit a first chat message to the first chatbot 750-1 and the second chatbot 750-2 (1205 and 1207). The intelligence server 700 may receive a first response generated depending on performing the first task from the first chatbot 750-1 (1209). The intelligence server 700 may receive a second response generated depending on the first task from the second chatbot 750-2 (1211). Because the first response and second response do not include a failure message for the first task, the intelligence server 700 may determine to transmit the first response and the second response to the user terminal 100 (1213). The user terminal 100 may output a chat message corresponding to the first response and a chat message associated with the second response through a chat interface (1217 and 1219).

Referring to FIGS. 9A, 9B, and 9C, in the chat interface (2), the chat message 911 may include tasks associated with the chatbot H and the chatbot R. Because the chat message 911 includes information of the location (Osaka in Japan) and date (from September 7 to September 10), the chat message 911 may include parameters of tasks capable of being performed by the chatbot H and the chatbot R. Accordingly, the chatbot H may provide information about hotels available for reservation, using the place and date as a response; the chatbot R may provide information about car rentals available for reservation, using the place and date as a response. The intelligence server 700 may transmit responses provided by the chatbot H and the chatbot R to the user terminal 100. Referring to the chat interface (2), the chat message 913 including a hotel list received from the chatbot H and the chat message 915 including a rental car list received from the chatbot R are displayed in response to the chat message 911.

In an embodiment, after receiving the first response and the second response, the user terminal 100 may receive a second chat message associated with the first response from the user (1219). The user terminal 100 may transmit a second chat message to the intelligence server 700 (1221).

In an embodiment, the intelligence server 700 may determine that the chatbot, which will deliver the second chat message, is the first chatbot 750-1 (1223). Because the second chat message is associated with the first response received from the first chatbot 750-1, the chatbot to which the second chat message is to be delivered may be determined as the first chatbot 750-1.

In various embodiments, the first response may include at least one selectable item. The intelligence server 700 may receive a selection input to the at least one selectable item as the second chat message.

In the chat interface (2) of FIGS. 9A, 9B and 9C, the chat message 913 corresponding to the response of the chatbot H may include two selectable items. For example, 'Nankai Osaka' and 'Namba Oriental' may be selectable items as available hotels.

Referring to the chat interface (3), the intelligence server 700 may receive a chat message 917 including a selection input to one of the selectable items "Nankai Osaka" and "Namba Oriental". The chat message 917 of "reserving Nankai Osaka Hotel" may include a selection input to "Nankai Osaka Hotel" among the selectable items. The intelligence server 700 may deliver the chat message 917 to the chatbot H.

In various embodiments, the intelligence server 700 may receive a first response including a question from the first chatbot 750-1. When receiving a chat message for the first response including a question from a user, the intelligence server 700 may transmit the chat message to the first chatbot 750-1.

Referring to the chat interface 3, the chat message 919 received from the chatbot H may include a question of 'which room do you want?'. The intelligence server 700 may deliver a chat message 921 of 'one room, two adults and two children' for the chat message 919 to the chatbot H, which is entered from the user.

In various embodiments, the intelligence server 700 may receive a chat message including at least one parameter associated with the first response after providing the first response.

In the interfaces (2) and (3) of FIGS. 9B and 9C, the chat message 917 may include a parameter associated with the chat message 913. Because the chat message 917 includes 'Nankai Osaka Hotel' which is a parameter for hotel reservation, the intelligence server 700 may transmit the chat message 917 to only the chatbot H.

In various embodiments, when a user enters a chat message corresponding to a response received from a specific chatbot, the 1:1 chat between the user and the specific chatbot may be started. The intelligence server 700 may change the state of the specific chatbot included in the 1:1 chat from a group session state to a sub-session state. When the state of specific chatbot is changed to the sub-session, the intelligence server 700 may deliver a chat message received from the user to a specific chatbot positioned in the sub-session.

In the chat interface (3) of FIG. 9C, because the user enters the chat message 917 corresponding to the response (the chat message 913) received from the chatbot H, the 1:1 chat between the chatbot H and the user may be started. The state of chatbot H may be changed from a group session state to a sub-session state. After the state of the chatbot H is changed to the sub-session state, the chat message 921 entered from the user terminal 100 may be transmitted to only the chatbot H.

In various embodiments, even when the 1:1 chat between a specific chatbot and the user is in progress, the intelligence server 700 may receive a chat message specifying the specific chatbot from the user terminal 100.

For example, in the chat interface (3) of FIG. 9C, even when the chatbot H is in the sub-session state, the chat message may be transmitted to the chatbot R when the user enters a chat message specifying the chatbot R. For example, after entering the chat message 921, the user may enter 'Honda civic' associated with the chat message 915 received by the chatbot R as a chat message (not shown). The intelligence server 700 may transmit the chat message to the chatbot R and may change the state of the chatbot R to a sub-session state.

The intelligence server 700 may end the 1:1 chat between the user and the chatbot H by changing the state of the chatbot H back to the group session state. Alternatively, the intelligence server 700 may simultaneously provide the 1:1 chat between the user and the chatbot H and the 1:1 chat between the user and the chatbot R.

Figure 13:
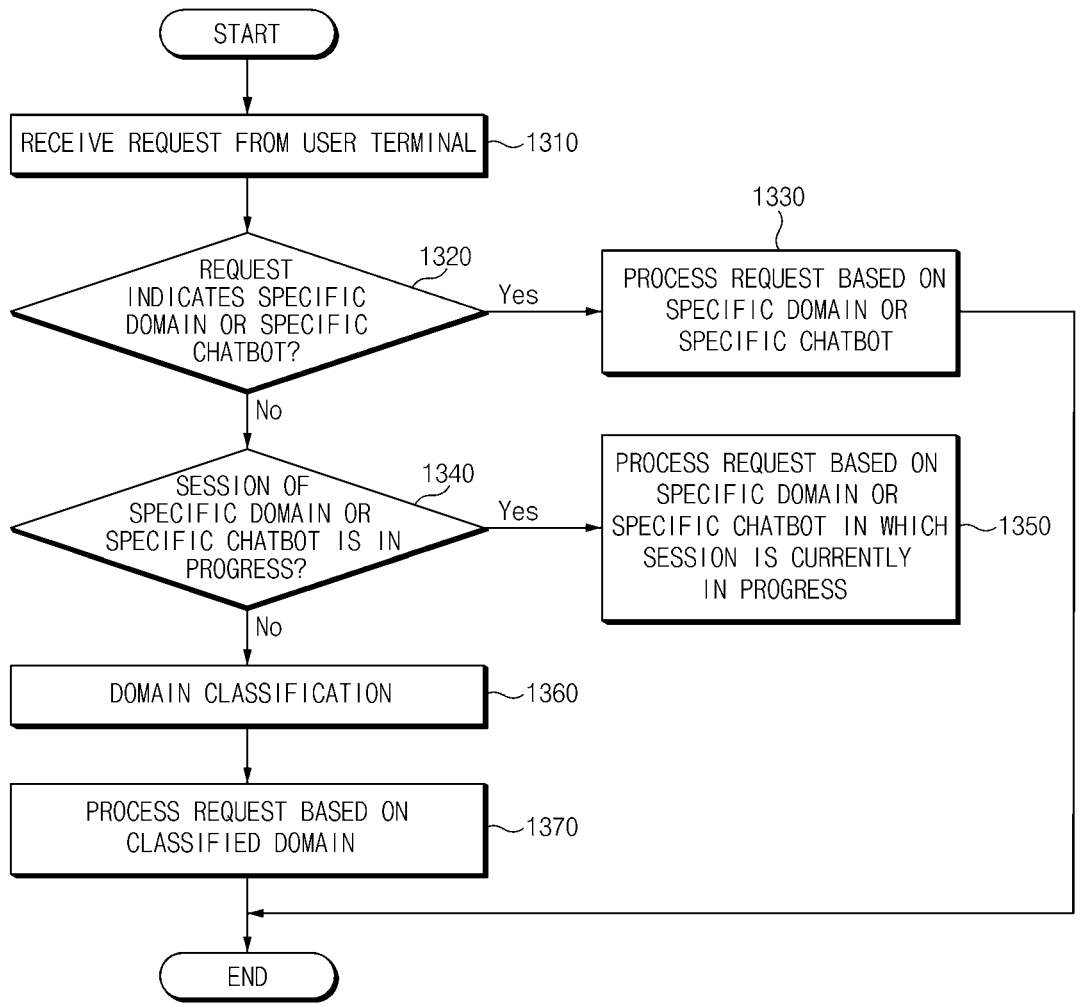
FIGS. 13 and 14 are operation flowcharts of an intelligence server according to various embodiments.
Figure 14:
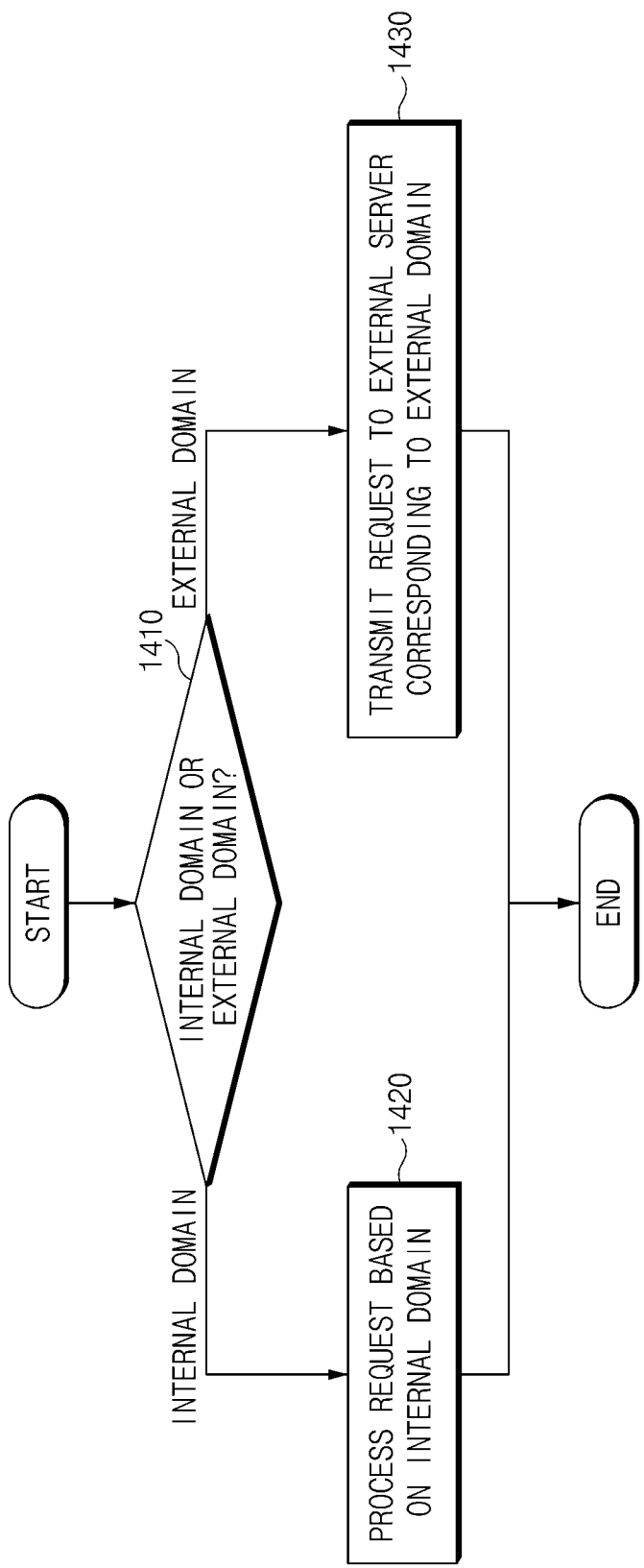

FIGS. 13 and 14 are operation flowcharts of an intelligence server according to various embodiments.

According to various embodiments, the intelligence server 700 (e.g., the intelligence server 200 of FIG. 5) may provide various services. In various embodiments, a domain may be referred to as classification items mapped to various services provided by the intelligence server 700. For example, as described above with reference to FIG. 5, the intelligence server 700 may obtain a domain for a user input through an NLU module (e.g., the NLU module 220 of FIG. 5). The domain may be preset and stored in the intelligence server 700.

In the meantime, a service (e.g., a chatbot service) provided by an external server may be understood as a service designed independently from the intelligence server 700 by a third party. Accordingly, the intelligence server 700 may not have information about commands capable of being processed by an external server.

For example, the intelligence server 700 may provide a chatbot operated by the intelligence server 700 through the above-described chat service. In this case, requests for internal chatbots operated by the intelligence server 700 may be processed by the intelligence server 700; chatbots operated by an external server may be processed by an external server. In various embodiments, the intelligence server 700 may classify a request capable of being processed inside the intelligence server 700 and a request capable of being processed by the external server.

In operation 1310, the intelligence server 700 may receive a request from the user terminal 100. For example, when a request is received as an utterance, the utterance may be converted into a text through the ASR module 707.

In various embodiments, the request may be received through a voice assistant service or chat service that is provided by the intelligence server 700. The intelligence server 700 may receive requests associated with various services.

In operation 1320, the intelligence server 700 may determine whether the received request indicates a specific domain or a specific chatbot. In operation 1330, when the received request indicates the specific domain or the specific chatbot, the intelligence server 700 may process the request based on the specific domain or specific chatbot.

In an embodiment, when the received request indicates the specific domain, the intelligence server 700 may directly process the request based on the specific domain. For example, when the received request indicates the specific chatbot, the received request may be transmitted to the specific chatbot.

For example, when the received request is 'show photos captured yesterday in a gallery app', because the 'gallery app' is specified, the intelligence server 700 may process the request based on the 'gallery domain'. For another example, when the request received is 'order a pizza', the intelligence server 700 may determine the request as a command to connect a pizza service chatbot (e.g., a chatbot provided by a pizza company). The intelligence server 700 may deliver the request to the pizza service chatbot. The intelligence server 700 may provide a list of pizza service chatbots to the user terminal 100 such that it is possible to order a pizza.

In operation 1340, when the received request does not indicate the specific domain or the specific chatbot, the intelligence server 700 may determine whether a session is currently in progress in the specific domain or the specific chatbot. For example, when the intelligence server 700 is currently processing a request corresponding to a specific domain, the intelligence server 700 may determine that a session of the specific domain is in progress. For example, when a chat with the specific chatbot is in progress, the intelligence server 700 may determine that a session of the specific chatbot is in progress.

In an embodiment, operation 1320 and operation 1340 may be performed by the session managing module 705 of the intelligence server 700. The session managing module 705 may manage both the request capable of being processed by the intelligence server 700 and the request capable of being processed by an external server, by performing operation 1320 and operation 1340 on requests corresponding to various services. In operation 1320, even though a session of any domain or any chatbot is already in progress, when the request indicates the specific domain or the specific chatbot, the session managing module 705 may allow the request to be processed in the indicated domain or chatbot. In operation 1340, when there is a domain or chatbot in which a session is already in progress, the session managing module 705 may process the request based on the domain or chatbot. Because the request is highly likely to be a request for a domain or chatbot in which a session is already in progress, the request may be processed highly efficiently.

In operation 1350, when the session is in progress, the intelligence server 700 may process the request based on a specific domain or a specific chatbot in which the session is in progress.

In operation 1360, when the session is not in progress, the intelligence server 700 may perform domain classification on the received request. In operation 1370, the intelligence server 700 may process the request based on the classified domain.

In various embodiments, the domain may be configured to include an external chatbot. In this case, referring to FIG. 14, in operation 1410, the intelligence server 700 may determine whether the received request is included in an internal domain or external domain.

In operation 1420, when it is determined that the received request is included in the internal domain, the intelligence server 700 may process the request based on the internal domain. For example, the intelligence server 700 may perform intent classification on the request.

In operation 1430, when it is determined that the received request is included in an external domain (e.g., an external chatbot), the intelligence server 700 may transmit the request to an external server corresponding to the external domain. For example, when the received request is included in the domain of the external chatbot, the received request may be transmitted to the external chatbot.

The above-described operation of the intelligence server 700 of FIGS. 13 and 14 may be performed before the operation of the intelligence server 700 of FIGS. 7 to 12. When the intelligence server 700 receives a request for an arbitrary service, the intelligence server 700 may first determine whether the received request is a request capable of being processed by the intelligence server 700 or a request capable of being processed by an external server. In particular, when providing a chatbot service operated by the external server, the intelligence server 700 may provide a chatbot service in the method described above in FIGS. 7 to 12. For example, the intelligence server 700 may transmit a request to an external chatbot and may receive a response to the request from the external chatbot. The response received from the external chatbot after operation 1430 may be processed by the intelligence server 700 in the method described above in FIGS. 7 to 12.

Figure 15:
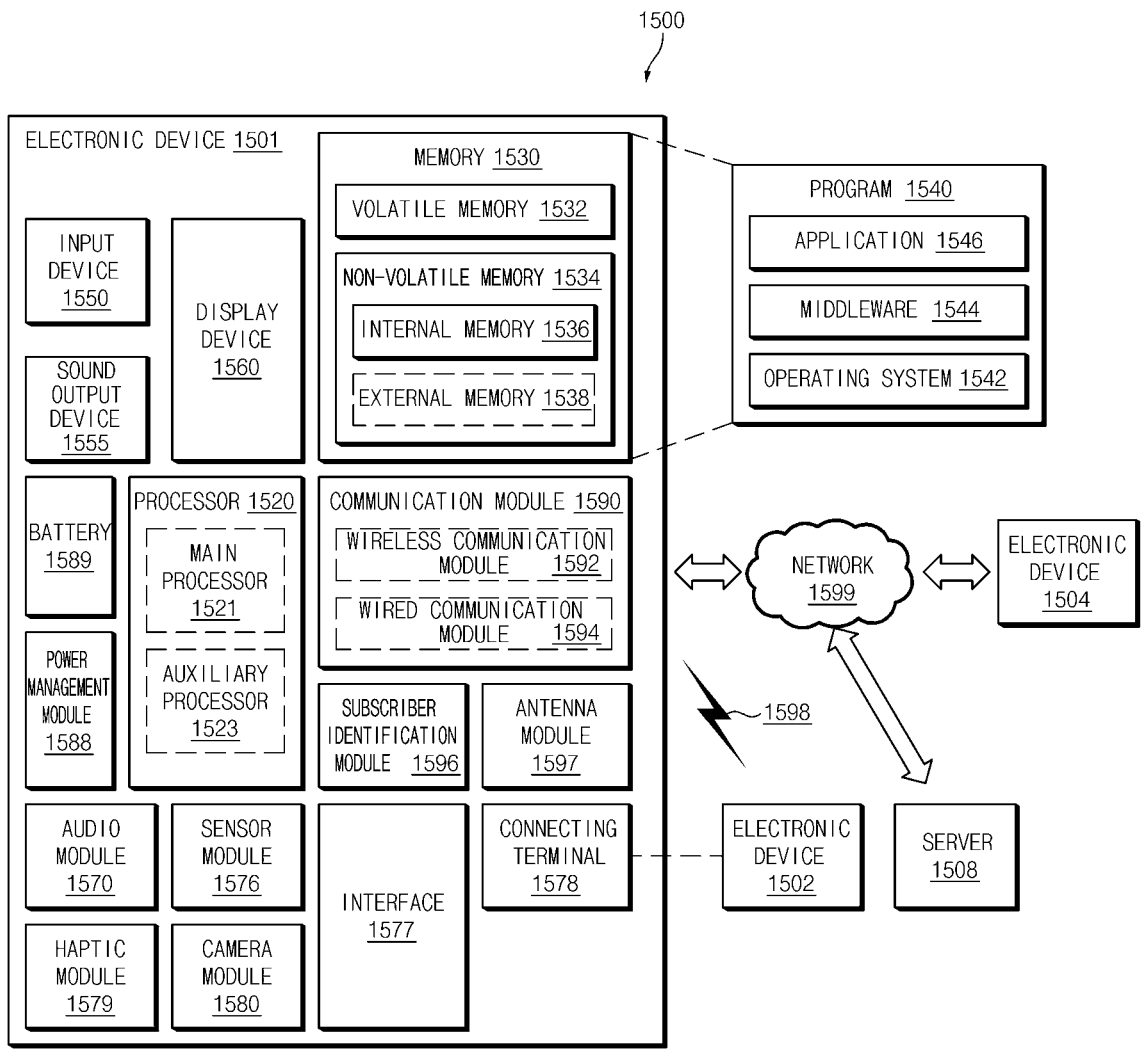
FIG. 15 illustrates an electronic device in a network environment, according to various embodiments.

FIG. 15 is a block diagram illustrating an electronic device 1501 (e.g., the user terminal 100 of FIG. 1) in a network environment 1500 according to various embodiments. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module

1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thererto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, or a keyboard.

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector), The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include one or more antennas, and, therefrom, at least one antenna appropriate for a communication scheme used in the communication network, such as the first network 1598 or the second network 1599, may be selected, for example, by the communication module 1590 (e.g., the wireless communication module 1592). The signal or the power may then be transmitted or received between the communication module 1590 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A system comprising:
 a network interface;
 at least one processor operatively connected to the network interface; and
 at least one memory operatively connected to the at least one processor,
 wherein the at least one memory stores instructions that, when executed, cause the at least one processor to:
  receive, through the network interface, a first request for calling a first chatbot to a chat based on at least one of a text or voice;
  cause the first chatbot to join the chat;
  receive a second request for calling a second chatbot to the chat through the network interface;
  cause the second chatbot to join the chat;
  after the first chatbot and the second chatbot join the chat, receive a third request including a task that is associated with the first chatbot and is not associated with the second chatbot;
  provide the third request to the first chatbot and to the second chatbot;
  receive a first response associated with the task from the first chatbot;
  receive a second response indicating failure of the task or inability to the task from the second chatbot; and
  provide only the first response through the network interface.

2. The system of claim 1, wherein the second response includes a null value.

3. The system of claim 1, further comprising:
 a display,
 wherein the instructions, when executed, cause the at least one processor to:
 display the first response through the display.

4. The system of claim 1, wherein the first chatbot provides a first service based on a first external server, and
 wherein the second chatbot provides a second service based on a second external server.

5. The system of claim 4, wherein the third request is mapped onto a command pre-stored in the first external server.

6. The system of claim 1, wherein the instructions that, when executed, cause the at least one processor to:
 receive a fourth request to specify the first chatbot through the network interface; and
 provide the fourth request to the first chatbot through the network interface.

7. The system of claim 1, wherein the instructions that, when executed, cause the at least one processor to:
 after providing the first response, receive a fourth request associated with the first response; and
 provide the fourth request to only the first chatbot among the first chatbot and the second chatbot.

8. The system of claim 7, wherein the first response includes at least one selectable item, and
 wherein the instructions that, when executed, cause the at least one processor to:
 receive a selection input to the at least one selectable item as the fourth request.

9. The system of claim 7, wherein the instructions that, when executed, cause the at least one processor to:
 receive the fourth request including at least one parameter associated with the first response.

10. The system of claim 7, wherein the instructions that, when executed, cause the at least one processor to:
 after receiving the fourth request, receive a fifth request to specify the second chatbot; and
 provide the fifth request to only the second chatbot among the first chatbot and the second chatbot.

11. The system of claim 7, wherein the instructions that, when executed, cause the at least one processor to:
 in response to receiving the fourth request associated with the first response, change a state of the first chatbot from a group session state to a sub-session state.

12. The system of claim 1, wherein the instructions that, when executed, cause the at least one processor to:
 receive a fourth request including a task associated with a first chatbot and the second chatbot;
 provide the fourth request to the first chatbot and the second chatbot;
 receive a third response associated with the fourth request from the first chatbot;
 receive a fourth response associated with the fourth request from the second chatbot; and provide the third response and the fourth response through the network interface.

13. The system of claim 1, wherein the instructions that, when executed, cause the at least one processor to:

after the first chatbot joins the chat, according to the second chatbot joining the chat, transmit at least part of context information associated with the first chatbot to the second chatbot.

14. A method for providing a chat service, the method comprising:

starting a chat service in which a first chatbot providing a first service and a second chatbot providing a second service join;

after the first chatbot and the second chatbot join the chat service, receiving a first chat message, which is directed to the first chatbot and is not directed to the second chatbot, through the chat service, wherein the first chat message includes a first task associated with the first chatbot;

providing the first chat message to the first chatbot and to the second chatbot;

receiving a first response generated depending on performing the first task from the first chatbot and receiving a second response including a failure message for the first task from the second chatbot; and providing the first response through the chat service and not providing the second response through the chat service.

15. The method of claim 14, further comprising:

receiving a second chat message to specify the first chatbot through the chat service; and providing the second chat message to only the first chatbot among the first chatbot and the second chatbot.

* * * * *